U S008044628B2

(12) United States Patent
Fujishiro et al.

(10) Patent No.: US 8,044,628 B2
(45) Date of Patent: Oct. 25, 2011

(54) CONTROLLER FOR MOTOR

(75) Inventors: Naoki Fujishiro, Saitama (JP); Daisuke Tsutsumi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 439 days.

(21) Appl. No.: 12/413,114

(22) Filed: Mar. 27, 2009

(65) Prior Publication Data

US 2009/0261770 A1 Oct. 22, 2009

(30) Foreign Application Priority Data

Apr. 22, 2008 (JP) ................................. 2008-111318

(51) Int. Cl.
*H02K 1/27* (2006.01)
*H02P 3/14* (2006.01)
*H02P 31/00* (2006.01)

(52) U.S. Cl. ........ 318/539; 318/538; 318/540; 318/563; 180/65.6; 180/65.8

(58) Field of Classification Search .................... 318/51, 318/538, 539, 540, 563; 310/114, 156.24; 180/65.6, 65.8
See application file for complete search history.

(56) References Cited

U.S. PATENT DOCUMENTS

| 6,449,552 | B2 | 9/2002 | Ohba et al. | |
|---|---|---|---|---|
| 6,700,268 | B2 * | 3/2004 | Joong et al. | 310/114 |
| 6,998,757 | B2 | 2/2006 | Seguchi et al. | |
| 7,216,943 | B2 | 5/2007 | Nishikawa et al. | |
| 7,863,847 | B2 * | 1/2011 | Morita et al. | 318/539 |
| 7,877,184 | B2 * | 1/2011 | Watanabe et al. | 701/54 |
| 7,952,313 | B2 * | 5/2011 | Fujishiro | 318/563 |
| 2002/0117933 | A1 * | 8/2002 | Joong et al. | 310/261 |
| 2003/0155201 | A1 * | 8/2003 | Bowen | 192/35 |
| 2005/0176543 | A1 * | 8/2005 | Kirkwood et al. | 475/5 |
| 2005/0205375 | A1 * | 9/2005 | Dolan | 192/21.5 |
| 2006/0197489 | A1 * | 9/2006 | Nakai et al. | 318/701 |
| 2006/0199697 | A1 * | 9/2006 | Kirkwood et al. | 477/5 |
| 2007/0205743 | A1 * | 9/2007 | Takahashi et al. | 318/807 |
| 2008/0040015 | A1 | 2/2008 | Fujishiro et al. | |
| 2008/0040016 | A1 | 2/2008 | Fujishiro | |
| 2008/0303471 | A1 * | 12/2008 | Fujishiro | 318/563 |
| 2009/0033250 | A1 * | 2/2009 | Morita et al. | 318/49 |
| 2009/0096307 | A1 * | 4/2009 | Tsutsumi et al. | 310/114 |

FOREIGN PATENT DOCUMENTS

| DE | 199 19 452 A1 | 11/2000 |
|---|---|---|
| EP | 0224144 | 6/1987 |
| EP | 1 237 258 A2 | 9/2002 |

(Continued)

*Primary Examiner* — Paul Ip
(74) *Attorney, Agent, or Firm* — Arent Fox LLP

(57) ABSTRACT

A controller is provided for a permanent magnet field motor including two rotors concentrically provided around a rotating shaft and a phase changing device for changing an angle of relative displacement in a circumferential direction between two rotors to serve as a power source for driving driven wheels of an all-wheel drive vehicle having two main driving wheels and at least two driven wheels, the controller including a drive control portion to control driving of the motor according to a drive mode of the all-wheel drive vehicle; and a phase instruction portion to issue an instruction, when the drive mode of the all-wheel drive vehicle is a main-driving-wheel drive mode, to set the angle of relative displacement at an angle at which a magnetic flux generated at each of the two rotors is weakened, as compared with that generated at each of the two rotors in an all-wheel drive mode.

10 Claims, 20 Drawing Sheets

FOREIGN PATENT DOCUMENTS

| | | |
|---|---|---|
| EP | 1 580 058 A2 | 9/2005 |
| EP | 1 806 827 A1 | 7/2007 |
| EP | 1 990 896 A1 | 11/2008 |
| JP | 2004-072978 A | 3/2004 |
| JP | 2005-176419 A | 6/2005 |
| JP | 2006-262600 A | 9/2006 |
| JP | 2007-112195 A | 5/2007 |

* cited by examiner

CONTROLLER FOR MOTOR

BACKGROUND OF THE INVENTION

The present invention relates to a controller for a permanent magnet field motor that has a first rotor and a second rotor concentrically provided around a rotating shaft and a phase changing device for changing an angle of relative displacement in a circumferential direction between the first rotor and the second rotor and that is provided as a power source for driving driven wheels of an all-wheel-drive vehicle having main driving wheels and driven wheels.

Hitherto, a motor has been known, which has a first rotor and a second rotor concentrically provided around a rotating shaft of a permanent magnet field rotary motor and which performs a field weakening control operation by changing a phase difference between the first rotor and the second rotor according to a rotational speed thereof or to the speed of a rotating field generated in a stator (see, e.g., Patent Document 1).

In a case where the motor described in Patent Document 1 controls the phase difference between the first rotor and the second rotor according to the rotational speed thereof, an angle of relative displacement in the circumferential direction therebetween is changed via a member displaced along a radial direction of the motor by the action of a centrifugal force. Further, in a case where the phase difference therebetween is controlled according to the speed of the rotating field generated in each of the rotors, the angle of relative displacement in the circumferential direction therebetween is changed by supplying control electric current to the winding of the stator so as to change the speed of the rotating field in a state in which each of the rotors maintains the rotational speed thereof by inertia.

[Patent Document 1] JP-A-2002-204541
[Patent Document 2] JP-A-2007-236049
[Patent Document 3] JP-A-2007-259549

Some four-wheel-drive vehicles are such that one of front and rear pairs of wheels serves as a pair of main driving wheels and is driven by an internal combustion engine and/or a motor, and that the other of the front and rear pairs of wheels serves as a pair of driven wheels and is driven by another motor. Such a vehicle can realize stable and powerful running, as compared with two-wheel-drive vehicles, by simultaneously driving the four wheels. Incidentally, a driving force required by a vehicle while the vehicle cruises is lower than that required while the vehicle is accelerated. Thus, the four-wheel-drive vehicle performs running by appropriately selecting one of a four-wheel drive mode, in which the vehicle performs running by driving both of the pairs of the main driving wheels and the driven wheels, and a two-wheel drive mode, in which the vehicle performs running by driving only the pair of the main driving wheels, according to a vehicular driving condition. In case of running on the frozen road surface, the four-wheel-drive mode is selected.

In a case where the aforementioned motor is used as a power source for driving a pair of driven wheels of such a four-wheel drive vehicle, when the motor is in a field strengthening state while the vehicle performs running in the two-wheel drive mode, a large drag loss is generated in the motor 1. When the vehicle performs running in the two-wheel drive mode, the first rotor and the second rotor rotate with respect to the stator in synchronization with the rotation of the driven wheels. In order to enable the first rotor and the second rotor to rotate with respect to the stator, a force being larger than a magnetic force due to a resultant magnetic flux synthesized from magnetic fluxes generated at the rotors is needed. Accordingly, in order to enable the vehicle to run in the two-wheel drive mode in a field strengthening state, a driving force exceeding the drag loss generated in the motor is required to be generated by the power source for driving the main driving wheels. Consequently, the fuel cost of the vehicle is increased.

SUMMARY OF THE INVENTION

An object of the invention is to provide a controller for a motor, which can generate, with minimum consumption energy, a driving force needed by an all-wheel-drive vehicle that has a motor, which is provided with a double rotor, as a power source for driving the driven wheels.

In order to solve the aforementioned problems and to achieve such an object, according to a first aspect of the invention, there is provided a controller for a permanent magnet field motor (e.g., a motor 10 in an embodiment to be described below) including a first rotor and a second rotor (e.g., an outer circumferential side rotor 21 and an inner circumferential side rotor 22 of the embodiment) concentrically provided around a rotating shaft and a phase changing device (e.g., turning mechanisms 30 and 30' in the embodiment) for changing an angle of relative displacement in a circumferential direction between the first rotor and the second rotor to serve as a power source for driving driven wheels of an all-wheel drive vehicle having two main driving wheels and at least two driven wheels, the controller including:

a drive control portion (e.g., a phase instruction portion 131 in the embodiment) to control driving of the motor according to a drive mode of the all-wheel drive vehicle; and a phase instruction portion (e.g., a phase instruction portion 131) to issue an instruction, when the drive mode of the all-wheel drive vehicle is a main-driving-wheel drive mode in which the all-wheel drive vehicle is driven only by the main driving wheels, to set the angle of relative displacement at an angle at which a magnetic flux generated at each of the first and second rotors is weakened, as compared with that generated at each of the first and second rotors in an all-wheel drive mode in which the all-wheel drive vehicle is driven by the main driving wheels and the drive wheels.

Further, according to a second aspect of the invention, there is provided the controller for a motor according to the first aspect, wherein an angle indicated by an instruction issued by the phase instruction portion in the main-driving-wheel drive mode is an angle of relative displacement at which a magnetic flux generated at each of the first rotor and the second rotor is most weakened.

Further, according to a third aspect of the invention, there is provided the controller for a motor according to the first or second aspect, further including:

a drive mode selecting portion (e.g., a four-wheel drive selecting switch 129 in the embodiment) to enable a driver of the all-wheel drive vehicle to select one of the main-driving-wheel drive mode and the all-wheel drive mode, wherein the drive control portion controls driving of the motor according to the drive mode selected by the drive mode selecting portion.

Further, according to a forth aspect of the invention, there is provided the controller for a motor according to one of the first to third aspects, further including:

a wheel speed sensor to detect a wheel speed of each of the main driving wheels and the driven wheels; and a slip state determination portion (e.g., a phase instruction portion 131 in the embodiment) to determine occurrence of a slip state based on the wheel speed of each of the wheels detected by the wheel speed sensor, wherein when the slip state determination portion determines that a slip state occurs, after the drive control portion drives the motor and sets the drive mode to be the all-wheel drive mode, the phase instruction portion issues an instruction to set the angle of relative displacement at an angle at which a magnetic flux generated at each of the first rotor and the second rotor is strengthened, as compared with that generated at each of the first rotor and the second rotor in the main-driving-wheel drive mode.

Further, according to a fifth aspect of the invention, there is provided the controller for a motor according to the third or forth aspect, wherein the angle of relative displacement set by the instruction issued by the phase instruction portion in the all-wheel drive mode is an angle of relative displacement at which a magnetic flux generated at each of the first rotor and the second rotor is most strengthened.

Further, according to a sixth aspect of the invention, there is provided the controller for a motor according to the forth aspect, wherein the slip state determination portion determines occurrence of each of slip states of different levels which include a high-level slip state to be determined based on a wheel speed difference between the two main driving wheels and a low-level slip state to be determined based on a wheel speed difference between the two main driving wheels and a wheel speed difference between the driven wheels;

when the slip state determination portion determines that a high-level slip state occurs, after the drive control portion drives the motor and sets the drive mode thereof to be the all-wheel drive mode, the phase instruction portion issues an instruction to set the angle of relative displacement at an angle at which a magnetic flux generated at each of the first rotor and the second rotor is most strengthened; and when the slip state determination portion determines that a low-level slip state occurs, after the drive control portion drives the motor and sets the drive mode thereof to be the all-wheel drive mode, the phase instruction portion issues an instruction to set the angle of relative displacement at an angle at which a magnetic flux generated at each of the first rotor and the second rotor is strengthened, as compared with that generated at each of the first rotor and the second rotor in the main-driving-wheel drive mode.

Further, according to a seventh aspect of the invention, there is provided the controller for a motor according to the first aspect, further including:

a vehicle speed sensor to detect a speed of the all-wheel drive vehicle;

a brake pedal force sensor to detect a brake pedal force indicating a degree of a driver's operation performed on a brake of the all-wheel drive vehicle; and a displacement angle sensor to detect the angle of relative displacement, wherein when braking of the power source is performed, the phrase instruction portion obtains a first regenerative expectation amount expected as obtained from the motor in a state in which the angle of relative displacement is a current angle of relative displacement detected by the displacement angle sensor, a second regenerative expectation amount expected as obtained from the motor in a state in which the angle of relative displacement has a magnitude required by the motor to generate a braking force of the all-wheel drive vehicle corresponding to the brake pedal force, and energy required by the phase changing device to change the current angle of relative displacement to the angle of relative displacement having the magnitude required by the phase changing device, based on the vehicle speed detected by the vehicle speed sensor and the brake pedal force detected by the brake pedal force sensor; and when a difference value between the first regenerative expectation amount and the second regenerative expectation amount is larger than the energy, the phase instruction portion issues an instruction to change the current angle of relative displacement to the angle of relative displacement having the magnitude required by the motor.

Further, according to an eighth aspect of the invention, there is provided a controller for a permanent magnet field motor (e.g., the motor 10 in the embodiment) including a first rotor and a second rotor (e.g., the outer circumferential side rotor 21 and the inner circumferential side rotor 22 in the embodiment) concentrically provided around a rotating shaft and a phase changing device (e.g., the turning mechanisms 30 and 30' in the embodiment) for changing an angle of relative displacement in a circumferential direction between the first rotor and the second rotor to serve as a power source for driving driven wheels of an all-wheel drive vehicle having two main driving wheels and at least two driven wheels, the controller including:

a drive control portion (e.g., the phase instruction portion 131 in the embodiment) to control driving of the motor according to a drive mode of the all-wheel drive vehicle;

an accelerator-opening sensor to detect an accelerator-opening indicating a degree of a driver's operation performed on an accelerator of the all-wheel drive vehicle; and a phase instruction portion (e.g., the phase instruction portion 131 in the embodiment) to issue an instruction, when the accelerator-opening detected by the accelerator-opening sensor is larger than a predetermined value, to cause the drive control portion to drive the motor and to set the drive mode of the all-wheel drive vehicle to be an all-wheel drive mode in which the all-wheel drive vehicle is driven by the main driving wheels and the drive wheels so as to set an angle of relative displacement at an angle at which a magnetic flux generated at each of the first and second rotors is strengthened, as compared with that generated at each of the first and second rotors in a main-driving-wheel drive mode in which the all-wheel drive vehicle is driven only by the main driving wheels.

According to a ninth aspect of the invention, there is provided the controller for a motor according to the eighth aspect, wherein when the accelerator-opening is equal to or less than the predetermined value, the phase instruction portion issues an instruction to set the angle of relative displacement at an angle at which a magnetic flux generated at each of the first and second rotors is weakened, as compared with that generated at each of the first and second rotors in an all-wheel drive mode.

According to the first to sixth aspects of the invention, in a main-driving-wheel drive mode, the motor is set to be in a weakened phase. Thus, the drag loss is small. The power source for driving the main driving wheels can generate a necessary driving force with minimal consumption energy. Consequently, the fuel cost of the vehicle is improved.

According to the fourth to sixth aspects of the invention, the drive mode is changed to the all-wheel drive mode when a vehicle skids. The motor is set to be in a strengthening phase or in an intermediate phase. Thus, when a vehicle skids, the vehicle can realize stable and powerful running in a main-driving-wheel driving mode.

According to the seventh aspect of the invention for a vehicle, regenerative energy can efficiently be obtained, based on a vehicle speed and a brake pedal force at the time of braking.

According to the eighth and ninth aspects of the invention for a motor, the drive mode is changed into the all-wheel drive mode when a driver presses down on an accelerator hard. The motor is set to be in a strengthening phase or the intermediate phase. Thus, the motor can be driven in a state in which the vehicle makes the best use of the performance of the motor.

DETAILED DESCRIPTION OF THE PREFERRED EMBODIMENTS

Figure 1:
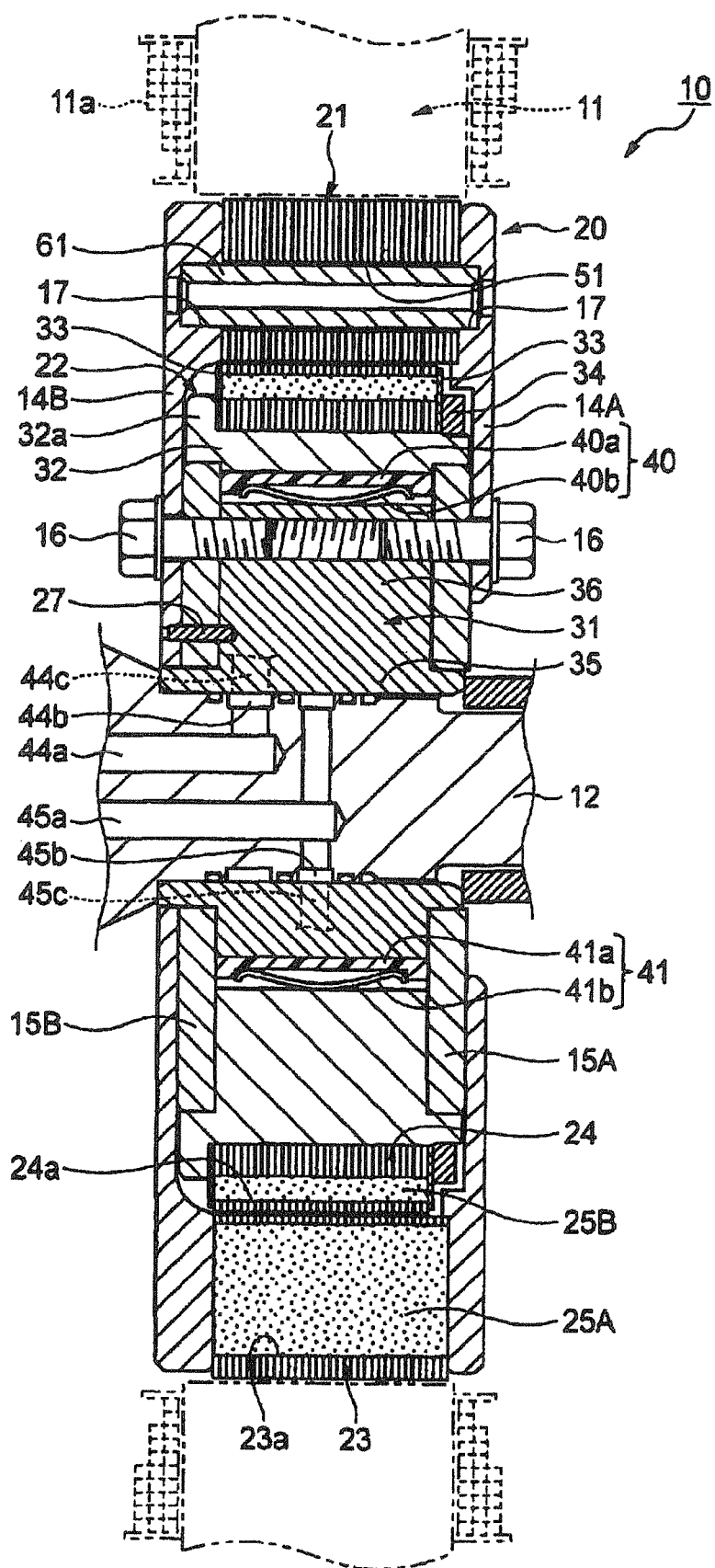
FIG. 1 is a cross-sectional diagram illustrating a motor and corresponds to a cross-sectional diagram taken in the direction of arrows A-A shown in FIG. 2.

A motor used in an embodiment described hereinafter is provided in a four-wheel drive vehicle configured so that one of the front and rear pairs of wheels serves as a pair of main driving wheels and is driven by an internal combustion engine and/or a motor, and that the other of the front and rear pairs of wheels serves as a pair of driven wheels and is driven by this motor. Incidentally, the fourth-wheel drive vehicle performs running by appropriating selecting, according to vehicular running conditions, one of two kinds of the following modes, that is, a four-wheel drive mode, in which the vehicle performs running by driving the main driving wheels and the driven wheels, and a two-wheel drive mode in which the vehicle performs running by driving only the main driving wheels. Incidentally, the vehicle can achieve stable and powerful running by simultaneously driving the four wheels, as compared with running performed in the two-wheel drive mode. Thus, especially in the case of rapid acceleration, the four-wheel drive mode is selected. Further, in the case of running on an icy road surface, the four-wheel drive mode is selected.

As illustrated in FIGS. 1 through 4, a motor 10 is an inner rotor type brushless direct-current (DC) motor in which a rotor unit 20 is disposed at the inner circumferential side of an annular stator 11. The stator 11 has a multiple phase stator wiring 11a. The rotor unit 20 has a rotating shaft 12 in an axial center part. In a case where the motor 10 is used as a power source for running and driving a vehicle, the torque of the motor 10 is transmitted to drive shafts (not shown) of wheels via a transmission (not shown). In this case, when the motor 10 is made to function as a generator when the vehicle is decelerated, generated electric power can be collected by the battery 137 as regenerative energy.

The rotor unit 20 includes an annular outer circumferential side rotor 21 and an annular inner circumferential side rotor 22 disposed on the inner side of the outer circumferential side rotor 21 coaxially therewith. The outer circumferential side rotor 21 and the inner circumferential side rotor 22 are provided relatively displaceably with each other within a range of a preliminarily set angle. For example, the relative rotation angle of each of outer circumferential side rotor 21 and the inner circumferential side rotor 22 can be changed to an advance-angle side or a retard-angle side within a range of 180 degrees in electric angle. Incidentally, in the following description, the angle of relative displacement in the circumferential direction of each of the outer circumferential side rotor 21 and the inner circumferential side rotor 22 is referred to as a "rotor phase difference".

Each of the outer circumferential side rotor 21 and the inner circumferential side rotor 22 is such that an associated one of annular yokes 23 and 24 serving as a rotor body is formed of laminated steel plates obtained by stacking a plurality of magnetic steel sheets in a direction along the rotating shaft 12. In each of the yokes 23 and 24, a plurality of magnet mounting slots 23a and 24a formed so as to penetrate therethrough in an axial direction are disposed in a circumferential direction at predetermined angular intervals (in the present embodiment, 22.5°).

Figure 5:
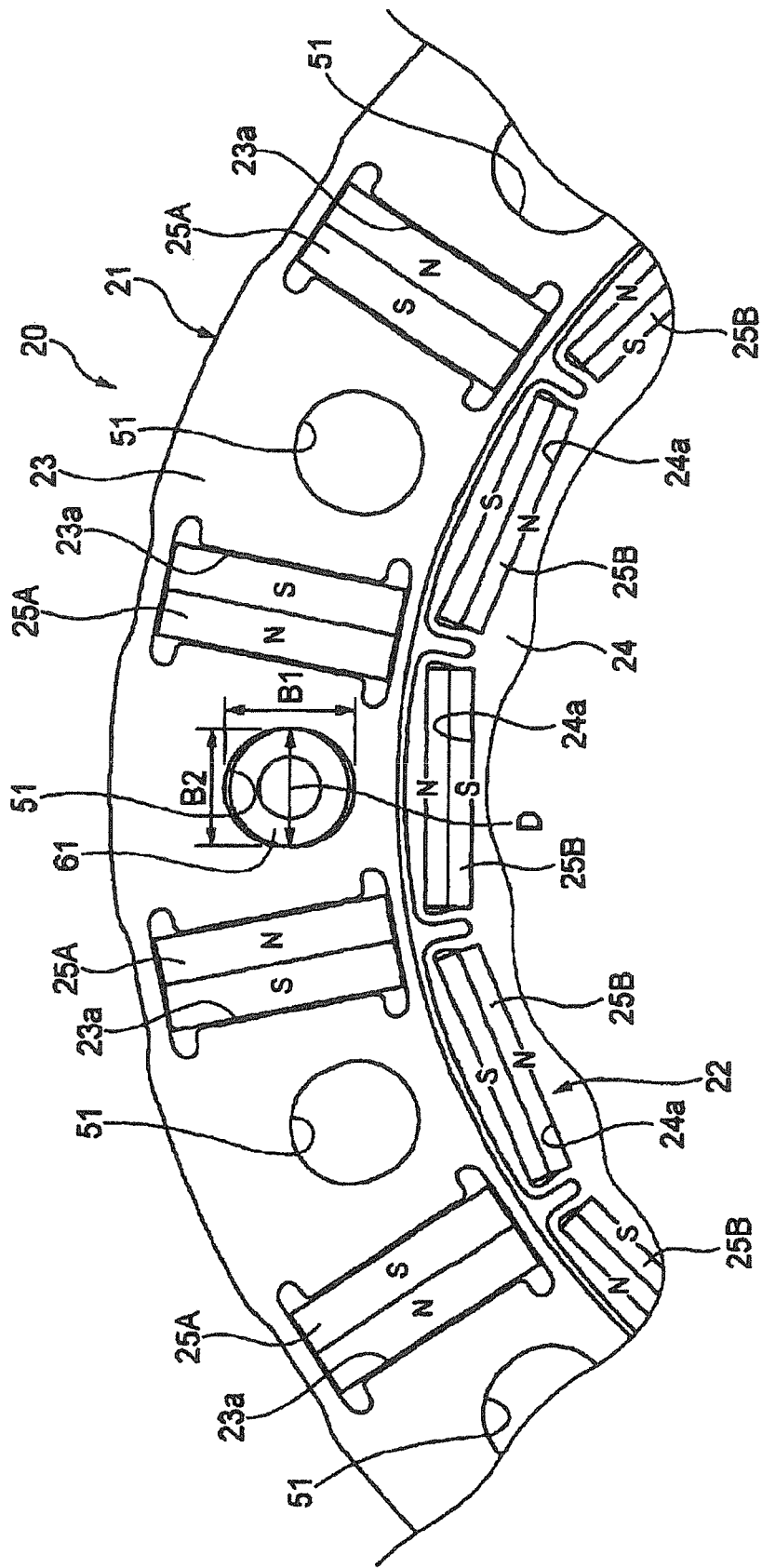
FIG. 5 is a primary-part enlarged diagram illustrating a strengthening phase state (field strengthening state) of the rotor unit.

In each of the magnet mounting slots 23a and 24a, an associated one of a flat-plate-like outer circumferential side permanent magnet 25A and a flat-plate-like inner circumferential side permanent magnet 25B, which are magnetized in the direction of thickness thereof, is mounted. As illustrated in FIG. 5, according to the present embodiment, each of the outer circumferential side permanent magnets 25A is disposed so that the direction of magnetization (i.e., the direction of thickness) is directed to a circumferential direction. Each of the inner circumferential side permanent magnets 25B is disposed so that the direction of magnetization (i.e., the direction of thickness) is directed to a radial direction. Thus, each pair of the adjacent outer circumferential side permanent magnets 25A and 25A and an associated one of the inner circumferential side permanent magnet 25B are disposed substantially like a letter "U".

Further, the number of the outer circumferential permanent magnets 25A provided on the yoke 23 is equal to that of the inner circumferential permanent magnets 25B provided on the other yoke 24 (in the present embodiment, 8 pole pairs are provided on each yoke). As illustrated in FIG. 5, the magnetic pole orientations of the adjacent outer circumferential side permanent magnets 25A disposed in the circumferential direction on the outer circumferential side rotor 21 are set to be opposite to each other. In addition, the magnetic pole orientations of the adjacent inner circumferential side permanent magnets 25B disposed in the circumferential direction on the inner circumferential side rotor 22 are set to be opposite to each other.

Figure 6:
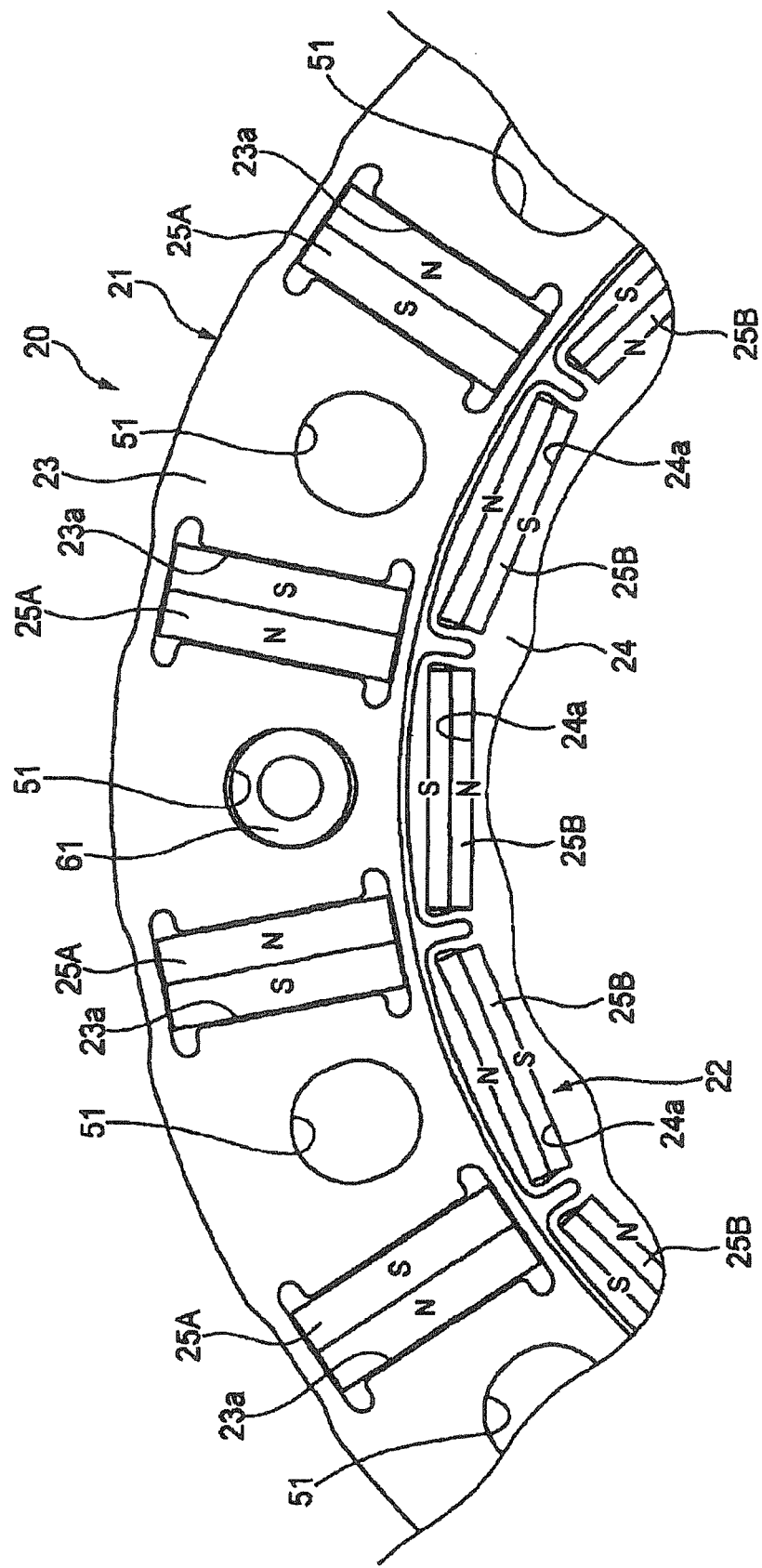
FIG. 6 is a primary-part enlarged diagram illustrating a weakening phase state (field weakening state) of the rotor unit.

As illustrated in FIG. 5, the rotor phase difference between the outer circumferential side rotor 21 and the inner circumferential rotor 22 is adjusted such that the opposed N-poles (or S-poles) of the adjacent outer circumferential side permanent magnets 25A are respectively positioned at places respectively corresponding to both sides of a pole of the same polarity (i.e., the N-pole (or the S-pole) of an associated one of the inner circumferential side permanent magnets 25B. Thus, the adjacent outer circumferential side permanent magnets 25A and the associated inner circumferential side permanent magnet 25B are put into a "strengthening phase state" (i.e., a "field strengthening state") in which the magnetic field of the entire rotor unit 20 is most strengthened. Incidentally, the rotor phase difference in this state is set to be zero in electric angle. As illustrated in FIG. 6, in a case where the rotor phase difference between the outer circumferential side rotor 21 and the inner circumferential rotor 22 is adjusted such that the opposed N-poles (or S-poles) of the adjacent outer circumferential side permanent magnets 25A are respectively positioned at places respectively corresponding to both sides of a pole of the different polarity (i.e., the S-pole (or the N-pole) of an associated one of the inner circumferential side permanent magnets 25B. Thus, the adjacent outer circumferential side permanent magnets 25A and the associated inner circumferential side permanent magnet 25B are put into a "weakening phase state" (i.e., a "field weakening state") in which the magnetic field of the entire rotor unit 20 is most weakened. Incidentally, the rotor phase difference in this state is set to be 180 degrees in electric angle.

Further, the rotor unit 20 includes a turning mechanism 30 for causing each of the outer circumferential side rotor 21 and the inner circumferential side rotor 22 to perform a relative turning operation. The turning mechanism 30 constitutes a phase changing device 13 for optionally changing an angle of relative displacement between the outer circumferential side rotor 21 and the inner circumferential side rotor 22. The turning mechanism 30 is driven by a hydraulic pressure (fluid pressure) of operating oil (operating liquid) serving as an incompressible operating fluid. The phase changing device 13 is constructed by including the turning mechanism 30 and a hydraulic pressure control device, which controls the supply and discharge of operating oil to and from the turning mechanism 30, as main elements.

Figure 2:
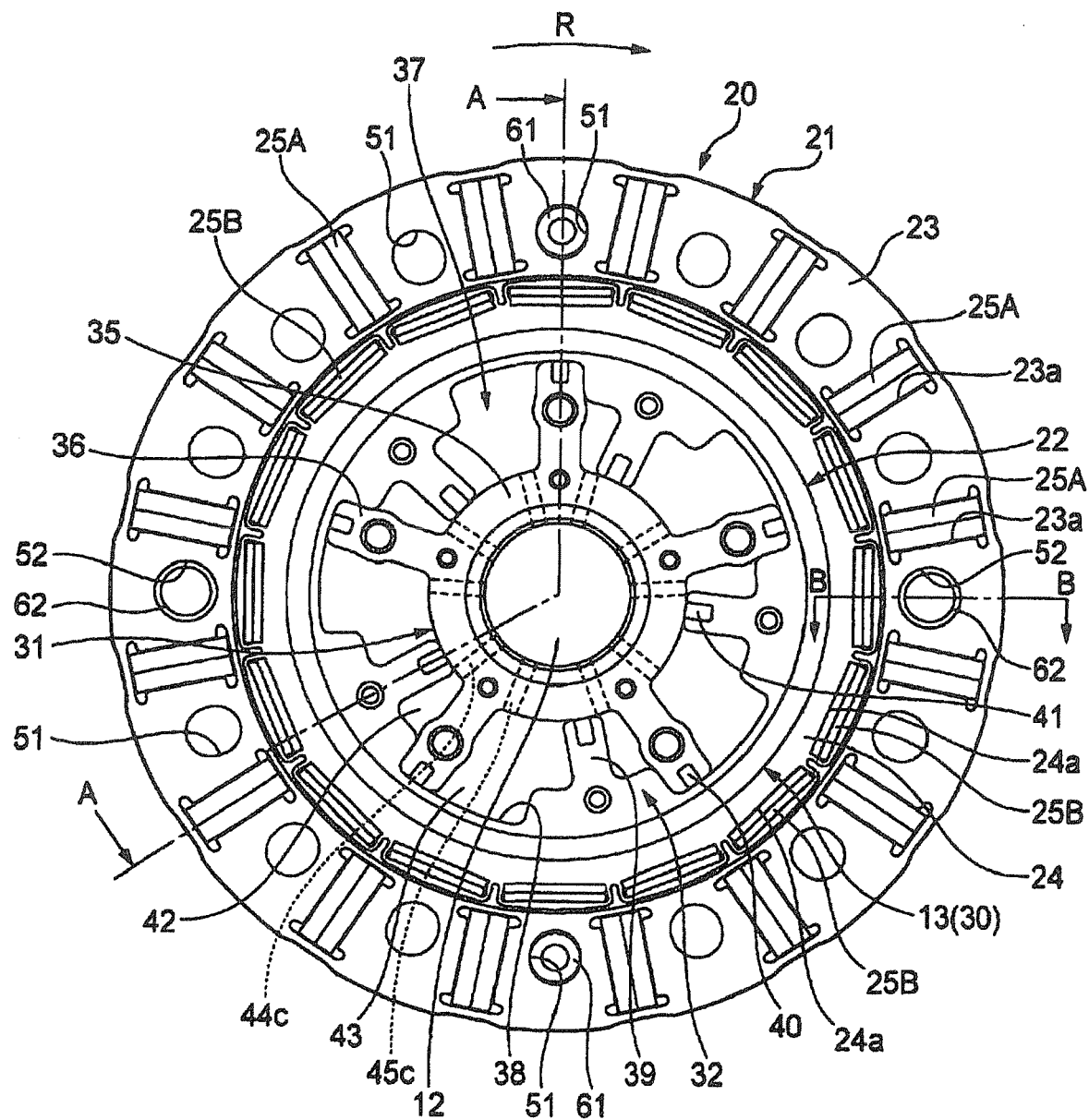
FIG. 2 is a diagram which illustrates a rotor unit shown in FIG. 1 and is taken from an axial direction.
Figure 3:
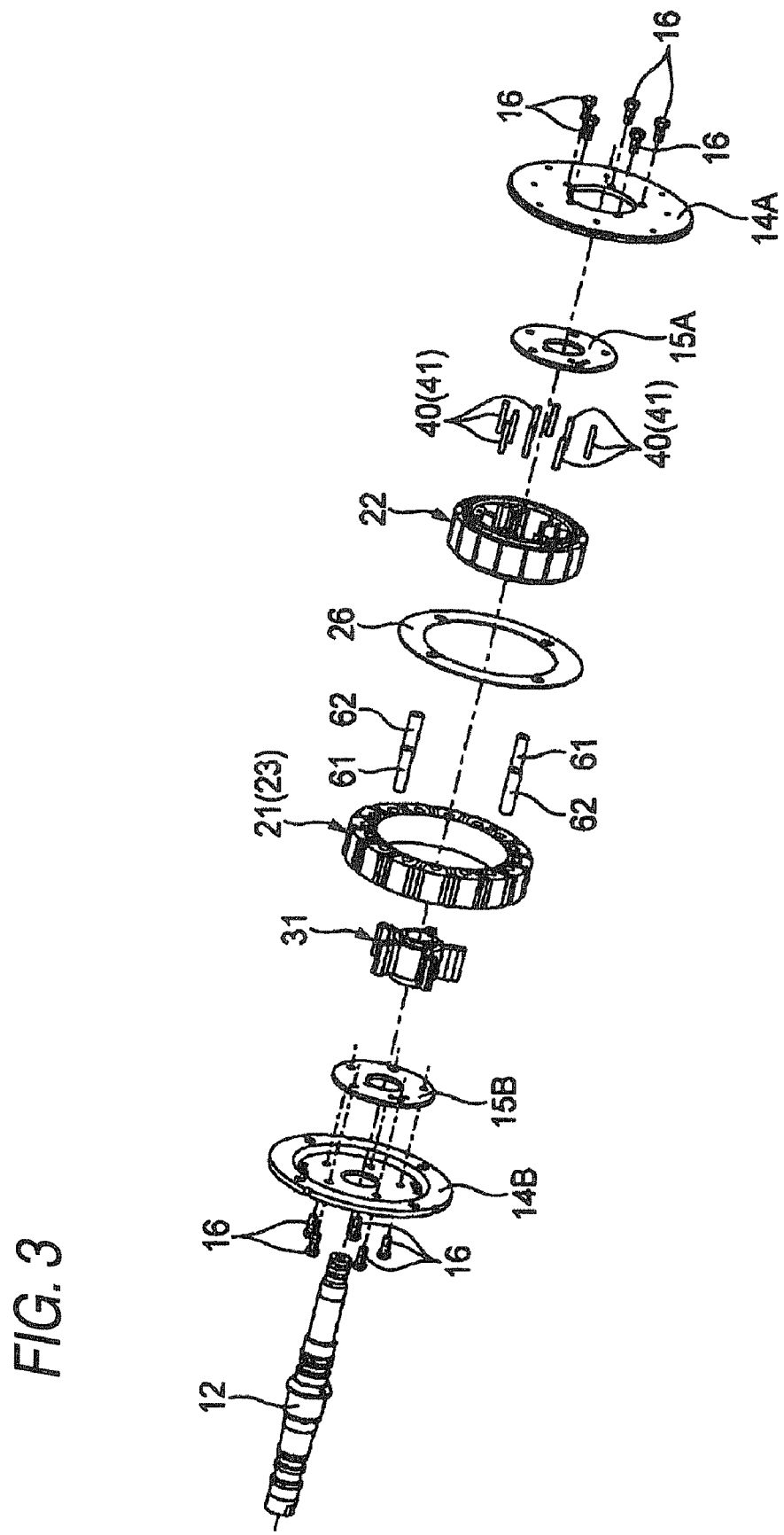
FIG. 3 is an exploded perspective diagram illustrating the rotor unit shown in FIG. 2.

As illustrated in FIGS. 1 through 3, the turning mechanism 30 includes a vane rotor 31 spline-fit to the outer circumferential side of the rotating shaft 12 integrally rotatably therewith, and an annular housing 32 disposed relatively turnably at the outer circumferential side of the vane rotor 31.

As illustrated in FIG. 1, the vane rotor 31 is connected to the outer circumferential rotor 21 via a pair of disk-like first drive plates 14A and 14B, which stride over the annular housing 32 and both of axial end surfaces of the inner circumferential side rotors 22, and a pair of disk-like second drive plates 15A and 15B which block up openings of both axial end portions of the annular housing 32. Thus, the outer circumferential side rotor 21, the first drive plates 14A, 14B, the second drive plates 15A, 15B, and the vane rotor 31, and the rotating shaft 12 are integrated with one another. Consequently, the driving force of the outer circumferential side rotor 21 is transmitted to the rotating shaft 12 via the first drive plates 14A and 14B.

In the drawings, reference numeral 16 designates a bolt which connects the first drive plates 14A, 14B, the second drive plates 15A, 15B, and the vane rotor 31 integrally with one another. Reference numeral 26 denotes a disk spring for reducing lost motion, which is interposed between the outer circumferential side rotor 21 and the first drive plate 14A. Reference numeral 27 designates a positioning pin for positioning the first drive plates 14A and 14B, the second drive plates 15A, 15B, and the vane rotor 31.

Figure 4:
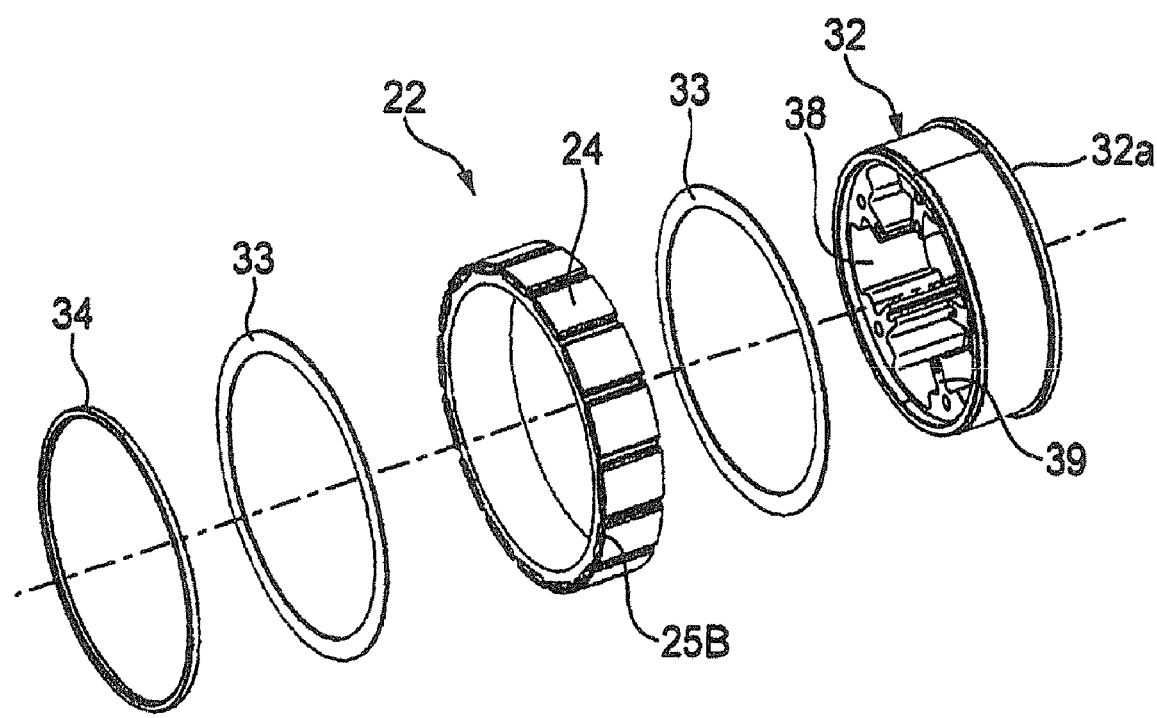
FIG. 4 is an exploded perspective diagram illustrating an inner circumferential side rotor shown in FIG. 2.

As illustrated in FIGS. 1 and 4, the annular housing 32 is disposed such that the inner circumferential side rotor 22, a pair of end surface plates 33, 33 for preventing the slip-off of the inner circumferential side permanent magnet 25B from the magnet mounting slot 24a, and a collar 34 for sandwiching the inner circumferential side rotor 22 and a pair of end surface plates 33, 33 between the collar 34 and a flange portion 32a formed on an axial end portion of the annular housing 32 are integrally fit onto and fixed at the outer circumferential surface of the annular housing 32. Accordingly, the annular housing 32 and the inner circumferential side rotor 22 are integrated with each other.

The vane rotor 31 is such that a plurality of vanes 36 protruding radially and outwardly are provided on the outer circumference 12 of a cylindrical boss portion 35 at equal intervals in the circumferential direction. The annular housing 32 is such that a plurality of concave portions 37 are provided in the inner circumferential surface thereof at equal intervals in the circumferential direction thereof, and that each of the vanes 36 is accommodated and arranged in an associated one of the plurality of concave portions 37. Each of the concave portions 37 includes a bottom wall 38, which has a circular-arc-like surface that approximately coincides with a rotational trajectory of a leading end portion of the vane 36, and a portioning wall 39 for partitioning and defining the adjacent concave portions 37 from each other. When each of the vane rotor 31 and the annular housing 32 performs a relative turning operation, the vanes 36 move between the partitioning wall 39 of one of the rotor 31 and the housing 32 and that of the other.

A seal member 40 including a seal 40a, which is slide-contacted with the bottom wall 38 along an axial direction, and a spring 40b, which pushes the seal 40a against the bottom wall 38, is provided at an end portion of each of the vanes 36. The seal member 41 is provided at an end portion of each of the partitioning walls 39 and includes a seal 41a, which is sliding-contacted with the axial outer circumferential surface of the boss portion 35, and a spring 41b which pushes the seal 41a against the outer circumferential surface of the boss portion 35. The seal member 41 liquid-tightly seals a space between the partitioning wall 39 and the outer circumferential surface of the boss portion 35.

The second drive plates 15A and 15B are slidably closely contacted with the axial end surface of the annular housing 32, and blocks up the side of each of the concave portions 37 of the annular housing 32. Thus, each of the concave portions 37 of the annular housing 32 forms each independent space together with the boss portion 35 of the vane rotor 31 and the second drive plates 15A and 15B provided on both sides thereof. This space is an introduction space into which operating oil is introduced. The inside of each introduction space is defined by each associated vane 36 of the vane rotor 31 into two chambers, one of which is an advance angle side operating chamber 42, and the other of which is a retard angle side operating chamber 43.

The advance angle side operating chamber 42 causes the inner circumferential side rotor 22 by the pressure of the operating oil introduced thereinto to perform a relative turning operation in the direction of the advance angle toward the outer circumferential side rotor 21, and the retard angle side operation chamber 43 causes the inner circumferential side rotor 22 by the pressure of the operating oil introduced thereinto to perform a relative turning operation in the direction of the retard angle toward the outer circumferential side rotor 21. In this case, the "advance angle" corresponds to advancement of the inner circumferential side rotor 22 to the outer circumferential side rotor 21 in a main rotational direction of the motor 10, which is indicated by arrow R shown in FIG. 2. The "retard angle" corresponds to movement of the inner circumferential side rotor 22 in a direction opposite to the man rotational direction R of the motor 10 toward the outer circumferential side rotor 21.

The supply and the discharge of operating oil to and from the advance angle side operating chamber 42 and the retard angle side operating chamber 43 are performed through the rotating shaft 12. More specifically, the advance angle side operating chamber 42 is connected to the hydraulic control apparatus via a passage hole 44a formed in the rotating shaft 12, an annular groove 44b, which is formed in the outer circumferential surface of the rotating shaft 12 and is connected to the passage hole 44a, and a plurality of conduction holes 44c formed in the boss portion 35 of the vane rotor 31 so as to extend substantially in a radial direction. Further, the retard angle side operating chamber 43 is connected to the hydraulic pressure control device via a passage hole 45a formed in the rotating shaft 12, an annular groove 45a, which is formed in the outer circumferential surface of the rotating shaft 12 and is connected to the passage hole 45b, and a plurality of conduction holes 45c formed in the boss portion 35 of the vane rotor 31 so as to extend substantially in a radial direction.

As illustrated in FIGS. 1 to 3 and 5, in the present embodiment, the connection between the outer circumferential side rotor 21 and each of the first drive plates 14A and 14B is implemented via first through holes 51 formed like elongated holes in the circumferential direction central portion between two outer circumferential side permanent magnets 25A placed in a part, in which the magnets are arranged at uniform intervals (in the present embodiment, 180°, and at a twelve o'clock position or a six o'clock position, as viewed in FIG. 2), on the yoke 23 of the outer circumferential side rotor 21 and via cylindrical torque transmission pins 61 that are inserted through the two first through holes 51 and have both end portions which are respectively inserted or pressed into pin holding holes 17 formed in the inner surfaces of the first drive plates 14A and 14B.

Further, in the present embodiment, each of the first through holes 51 is such that the radial width B1 thereof is set to be larger than the diameter D of the torque transmission pin 61, and that the circumferential width B2 thereof is substantially equal to the diameter D of the torque transmission pin 61. Thus, the torque transmission pin 61 and the first through hole 51 are contacted with each other in the circumferential direction. Consequently, the driving force of the outer circumferential side rotor 21 is transmitted to the first drive plates 14A and 14B. Further, a radial clearance is formed between the torque transmission pins 61 and the first through holes 51. Thus, even when the yoke 23 is deformed by a centrifugal force, a deformation load does not act upon the torque transmission pins 61.

Further, in the present embodiment, each second circular through hole 52 is formed in the circumferential central portion between the two outer circumferential side permanent magnets 25A placed between the outer circumferential side permanent magnets 25A of the yoke 23 of the outer circumferential side rotor 21 at uniform intervals (in the present embodiment, 180°, and at a three o'clock position or a nine o'clock position, as viewed in FIG. 2). A cylindrical peel-off prevention pin 62 is pressed into each of the second through holes 52. Accordingly, the laminated steel plates constituting the yoke 23 are integrally fixed thereto in an axial direction. Thus, the peel-off of the laminated steel plates of the yoke 23 can be prevented. In addition, in a case where the left, right, top and bottom positions at one end side of the yoke 23 are restricted, the shaft center of the outer circumferential side rotor 21 is secured. Further, the torque transmission pins 61 and the peel-off prevention pins 62 are alternately arranged in a circumferential direction at uniform intervals (i.e., at uniform interval of 90°)

Further, in the present embodiment, as illustrated in FIG. 2, the inside diameter of the peel-off prevention pin 62 is set so that the area of the inside-diameter side of each peel-off prevention pin 62 is equal to the area of the first though hole 51. Thus, stress acting upon the yoke 23 is uniformized in the circumferential direction by a centrifugal force.

Figure 7:
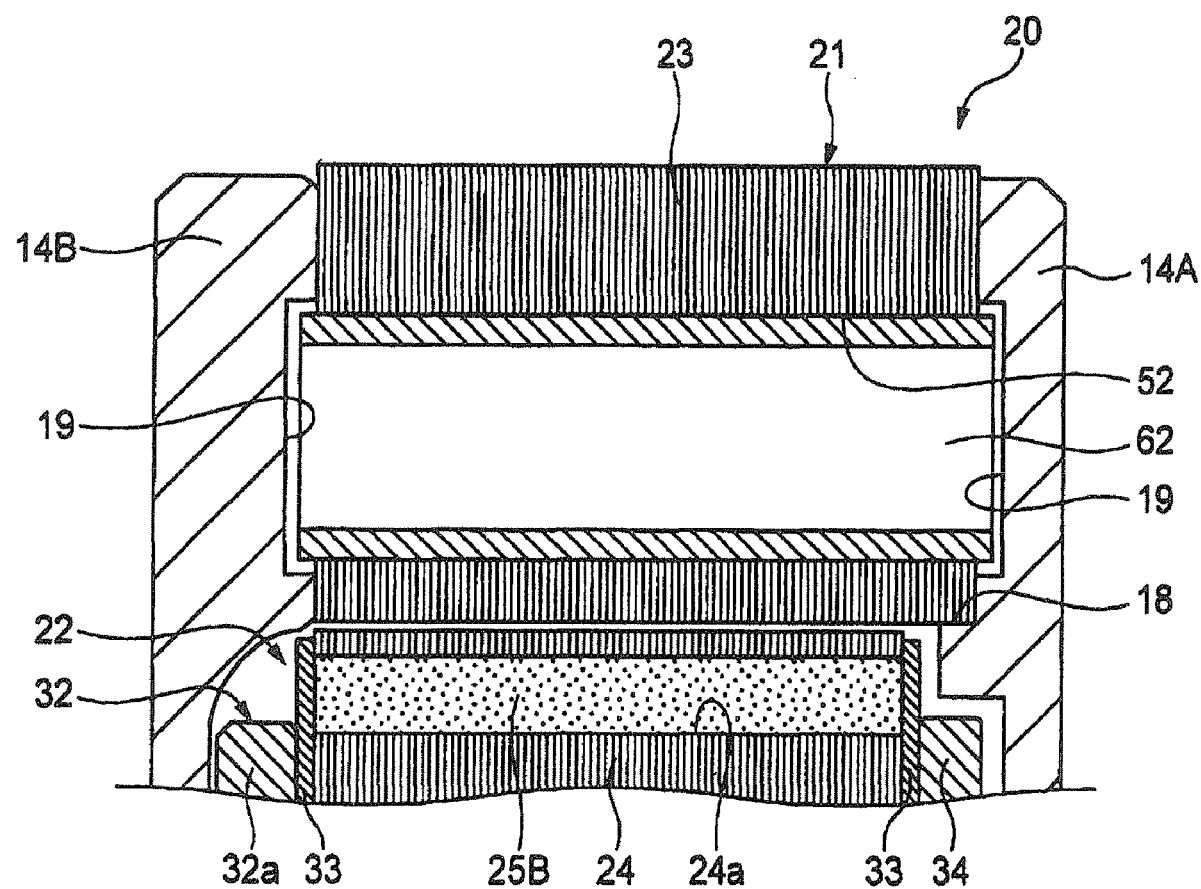
FIG. 7 is a cross-sectional diagram taken in the direction of arrows B-B shown in FIG. 2.

As illustrated in FIG. 7, in the present embodiment, a step-like portion 18 having the same diameter as the inside diameter of the yoke 23 of the first drive plate 14A is formed. The yoke 23 is fit onto the step-like portion 18. Thus, the left, right, top and bottom positions of the outer circumferential side rotor 21 are restricted. The outer circumferential side rotor 21 is disposed concentrically with the first drive plate 14A. The shaft center of the outer circumferential side rotor 21 is assured. In addition, the outer circumferential side rotor 21 and the inner circumferential side rotor 22 are concentrically arranged.

Further, a concave portion 19, in which a predetermined clearance is provided, is formed in the inner surface of each of the first drive plates 14A, 14B between peel-off prevention pin 62 and each of the first drive plates 14A and 14B. Thus, the peel-off prevention pin 62 is not contacted with each of the first drive plates 14A and 14B radially and circumferentially.

Further, as illustrated in FIGS. 1 and 5, the first through holes 51 are formed in the circumferential central portions other than parts, in which the torque transmission pins 61 and the peel-off prevention pins 62 are formed, between the outer circumferential side permanent magnets 25A of the yoke 23 of the outer circumferential side rotor 21. Accordingly, the stress acting upon the yoke 23 is uniformized in the circumferential direction by a centrifugal force.

In the motor 10 constructed in this manner, in a case where field characteristics are changed, the supply and the discharge of operating oil are performed by the hydraulic pressure control device. Thus, one of the advance angle side operating chamber 42 and the retard angle side operating chamber 43 is supplied with operating oil. On the other hand, operating oil is discharged from the other of the advance angle side operating chamber 42 and the retard angle side operating chamber 43. When the supply and the discharge of operating oil are controlled, the vane rotor 31 and the annular housing 32 perform relative turning operations. Along with this, the relative phase between the outer circumferential side rotor 21 and the inner circumferential side rotor 22 is operated.

Figure 8:
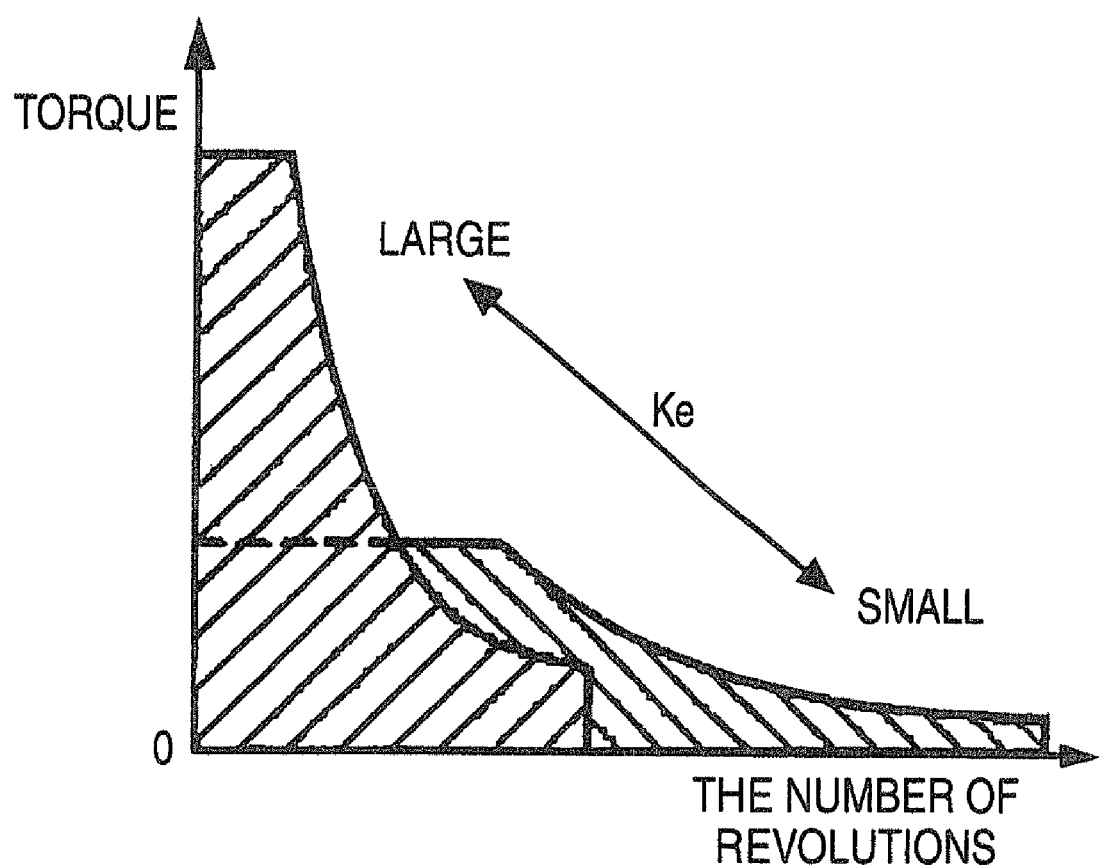
FIG. 8 is a graph illustrating an operable range determined by the number of revolutions and the torque of the motor, which change according to an induced voltage constant Ke.

When the rotor phase difference between the outer circumferential side rotor 21 and the inner circumferential side rotor 22 is operated, the strength of a magnetic field applied to the stator 11 changes between the strengthening phase state (field weakening state) illustrated in FIG. 5 and the weakening phase state (field weakening state) illustrated in FIG. 6. Along with change in the strength of a magnetic field applied to the stator 11 changes, an induced voltage constant Ke changes. Consequently, the characteristics of the motor 10 are changed. That is, when the induced voltage constant Ke is increased by the strengthening field, as illustrated in FIG. 8, an allowable rotational speed, at which the motor 10 is operable as an electric motor, is reduced. However, outputtable maximum torque is increased. On the other hand, when the induced voltage constant Ke is reduced by the weakening field, the outputtable maximum torque of the motor 10 is reduced, while the allowable rotational speed, at which the motor 10 is operable, is raised.

Figure 9:
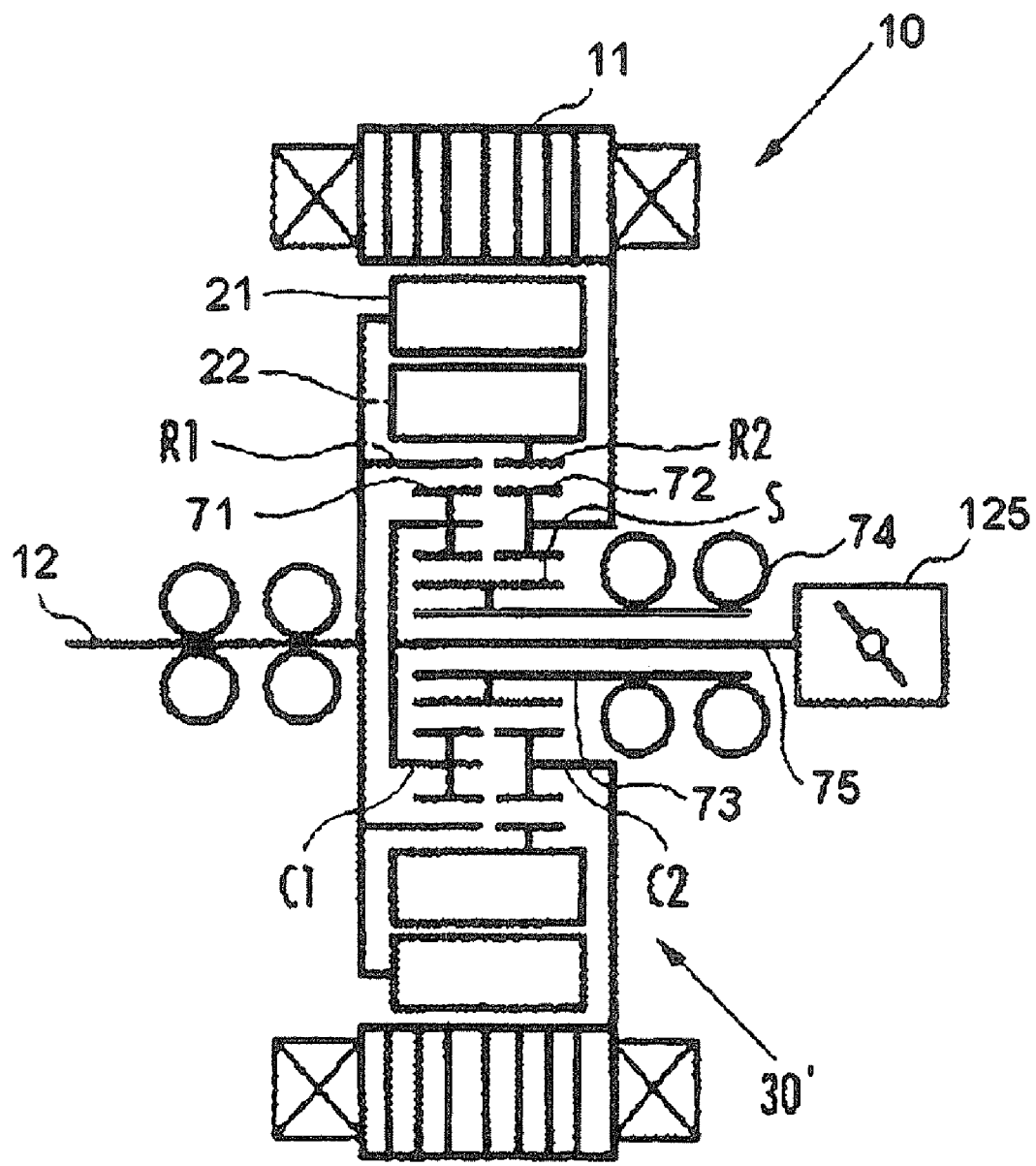
FIG. 9 is a diagram illustrating the internal configuration of a motor having a planetary type turning mechanism.

The aforementioned turning mechanism 30 is the phase changing device of the vane type. However, the turning mechanism 30 can be a phase changing device of the planetary type which is described below. FIG. 9 is a diagram illustrating the internal configuration of a motor having a turning mechanism of the planetary type. A turning mechanism 30' shown in FIG. 9 is a single pinion type planetary gear mechanism disposed in the inner circumferential side hollow portion of the inner circumferential side rotor 22. The turning mechanism 30' includes a first ring gear R1 formed concentrically and integrally with the outer circumferential side rotor 21, a second ring gear R2 formed concentrically and integrally with the inner circumferential side rotor 22, a first planetary gear 71 that meshes with the first ring gear R1, a second planetary gear 72 that meshes with the second ring gear R2, a sun gear S serving as an idle gear that meshes with the first planetary gear 71 and the second planetary gear 72, a first planetary carrier C1 that rotatably supports the first planetary gear 71 and that is axially supported by the rotating shaft 12, and a second planetary carrier C2 that rotatably supports the second planetary gear 72 and that is fixed to the stator 11.

The first ring gear R1 and the second ring gear R2 have substantially the same gear shape. The first planetary gear 71 and the second planetary gear 72 have substantially the same gear shape. A rotating shaft 73 of the sun gear S is disposed concentrically with the rotating shaft 12 of the motor 10 and is rotatably and axially supported by a bearing 74. Thus, the first planetary gear 71 and the second planetary gear 72 mesh with the sun gear S. Consequently, the outer circumferential side rotor 21 and the inner circumferential side rotor 22 rotate in synchronization with each other. Furthermore, a rotating shaft 75 of the first planetary carrier C1 is disposed concentrically with the rotating shaft 12 of the motor 10 and is connected to an actuator 125. The second planetary carrier C2 is fixed to the stator 11.

In response to a control signal input from a phase difference control system of a control apparatus, the actuator 125 causes the first planetary carrier C1 by a hydraulic pressure to rotate in a normal rotation direction or a reverse rotation direction. Alternatively, the actuator 125 regulates the rotation of the first planetary carrier C1 around the rotating shaft 2. When the first planetary carrier C1 is rotated by the actuator 125, the rotor phase difference between the outer circumferential side rotor 21 and the inner circumferential side rotor 22 is changed.

<Controller for Motor 10>

Figure 10:
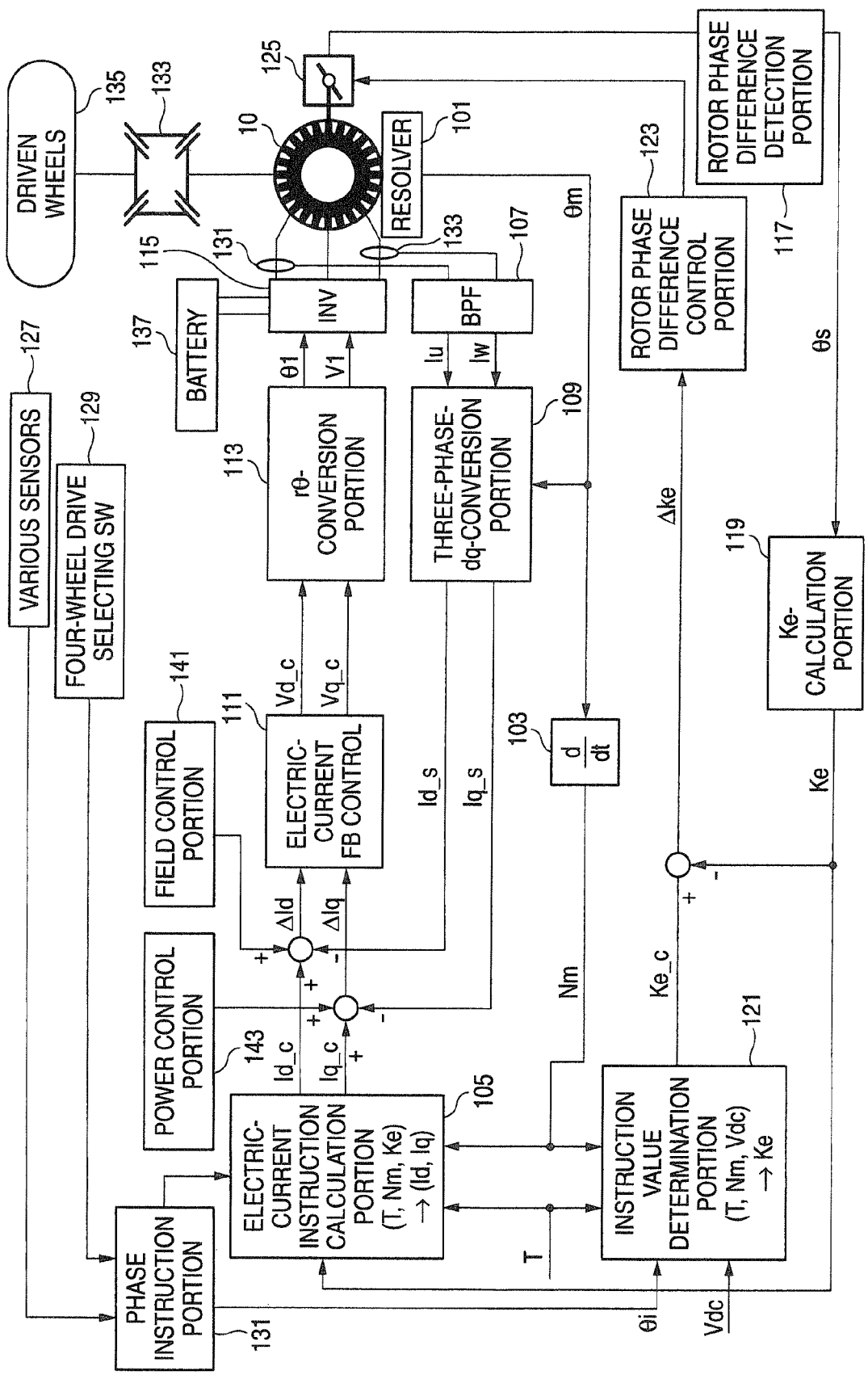
FIG. 10 is a block diagram illustrating a control unit of a motor according to an embodiment of the invention.

FIG. 10 is a block diagram illustrating a controller for the motor 10, which is an embodiment of the invention. The controller for the motor 10, which is illustrated in FIG. 10, includes a resolver 101, a revolution number calculation portion 103, an electric-current instruction calculation portion 105 included in an electric current control system, a bandpass filter (BPF) 107, a three-phase-dq-conversion portion 109, an electric-current feedback (FB) control portion 111, an rθ-conversion portion 113, an inverter (INV) 115, the aforementioned actuator 125, a rotor phase difference detection portion 117, a Ke-calculation portion 119, an instruction value determination portion 121 and a rotor phase difference control portion 123 which are included in a phase difference control system, various sensors 127, a four-wheel drive selecting switch 129, and a phase instruction portion 131. Incidentally, the motor 10 is connected to the driven wheels 135 via a differential gear 133. Further, a battery 137 is connected to the inverter 115.

The resolver 101 detects a mechanical angle of the outer circumferential side rotor 12 of the motor 10 and outputs an electrical angle θm corresponding to the detected mechanical angle. The electrical angle θm output from the resolver 101 is sent to the three-phase-dq-conversion portion 109 and the revolution number calculation portion 103. The revolution number calculation portion 103 calculates the angular velocity ω of the outer circumferential side rotor 12 and the number Nm of revolutions per unit time of the outer circumferential side rotor 12 from the electrical angle θm input from the resolver 101. The number Nm of revolutions calculated by the revolution number calculation portion 103 is sent to the electric-current instruction calculation portion 105 and the instruction value determination portion 121.

The electric-current instruction calculation portion 105 determines an instruction value Iq_c of electric current (hereunder referred to as "d-axis current") to be fed to a d-axis-side armature (hereunder referred to as a "d-axis armature") and an instruction value Iq_c of electric current (hereunder referred to as "q-axis current") to be fed to a d-axis-side armature (hereunder referred to as a "q-axis armature"), based on a torque instruction value T input from an external device, the number Nm of revolutions of the motor 10 calculated by the revolution number calculation portion 103, and the induced voltage constant Ke calculated by the Ke calculation portion 119.

The three-phase-dq-conversion portion 109 performs a three-phase dq-conversion based on electric-current detection signals Iu and Iw detected by electric current sensors 131 and 133, from which unnecessary components are removed by the BPF 107, and on the electrical angle θm of the outer circumferential side rotor 12 detected by the resolver 73.

The electric-current FB control portion 111 determines an instruction value Vd_c of the inter-terminal voltage (hereunder referred to as a "d-axis voltage") of the d-axis armature and an instruction value Vq_c of the inter-terminal voltage (hereunder referred to as a "q-axis voltage") of the q-axis armature such that a deviation ΔId between the instruction value Id_c and a detection value Id_s of the d-axis current and a deviation ΔIq between the instruction value Iq_c and a detection value Iq_s of the q-axis current are reduced. Incidentally, the deviation ΔId is controlled by a field control portion 141. Further, the deviation ΔIq is controlled by an electric power control portion 143.

The rθ-conversion portion 113 converts the instruction value Vd_c of the d-axis voltage and the instruction value Vq_c of the q-axis voltage into a magnitude component V1 and an angle component θ. The inverter 115 generates a pulse width modulation (PWM) signal based on the magnitude component V1 and the angle component θ. Thus, the rθ-conversion portion 113 converts a direct-current sent from the battery 137 into three-phase (U, V, and W) alternating current under PWM control.

The rotor phase difference detection portion 117 detects an actual rotor phase difference θs. As described above, when the magnetic flux of a field changes according to a rotor phase difference, the induced voltage constant Ke of the motor 10 also changes. Thus, the Ke-calculation portion 119 calculates an induced voltage constant Ke from the detected actual rotor phase difference θs by the rotor phase difference detection portion 117.

The instruction determination portion 121 determines an instruction value Ke_c of the induced voltage constant based on an externally input torque instruction value T, the number of revolutions Nm of the motor 10 calculated by the revolution number calculation portion 103, and a battery voltage Vdc of a battery 137. Further, the instruction value determination portion 121 determines Ke_c of the induced voltage constant Ke based on a phase instruction value θc sent from the phase instruction portion 131. The rotor phase difference control portion 123 outputs a control signal such that a deviation ΔKe between the instruction value Ke_c of the induced voltage constant output from the instruction value determination portion 121 and the induced voltage constant Ke calculated by the Ke-calculation portion 119 is reduced. Thus, the phase difference control portion 123 controls the actuator 125. Incidentally, when the rotor phase difference is changed by the actuator 125, the induced voltage constant Ke of the motor 10 is also changed.

The various sensors 127 include a wheel speed sensor which detects the speed (rotational speed) of each of the four wheels that the vehicle of the invention has, a vehicle sensor that detects the speed of the vehicle (vehicle speed), a sensor that detects a driver's operation amount including a brake pedal force and an accelerator opening, and a sensor that detects the turning-on/turning-off of a brake switch. The four-wheel drive selecting switch 129 is a switch used by a driver of the vehicle to select one of the four-wheel drive mode and the two-wheel drive mode. Incidentally, when the driver selects the four-wheel drive mode, the driver turns on the four-wheel drive selecting switch 129.

The phase instruction portion 131 determines a desired rotor phase difference of the motor 10 based on information sent from the various sensors 127, information representing the drive mode selected by the four-wheel drive selecting switch 129, and a current electrical angle θm detected by the resolver 101. Then, the phase instruction portion 131 outputs a phase instruction value θi, which representing the desired rotor phase difference, to the instruction value determination portion 121. Further, the phase instruction portion 131 gives an instruction, which indicates whether it is necessary to drive the motor 10, to the electric-current instruction calculation portion 105, based on information sent from the various sensors 127 and information representing the drive mode selected by the four-wheel drive selecting switch 129. Incidentally, when the electric-current instruction calculation portion 105 is instructed to drive the motor 10, electric current is supplied to the motor 10. Thus, the vehicle performs running by driving the four wheels.

Figure 11:
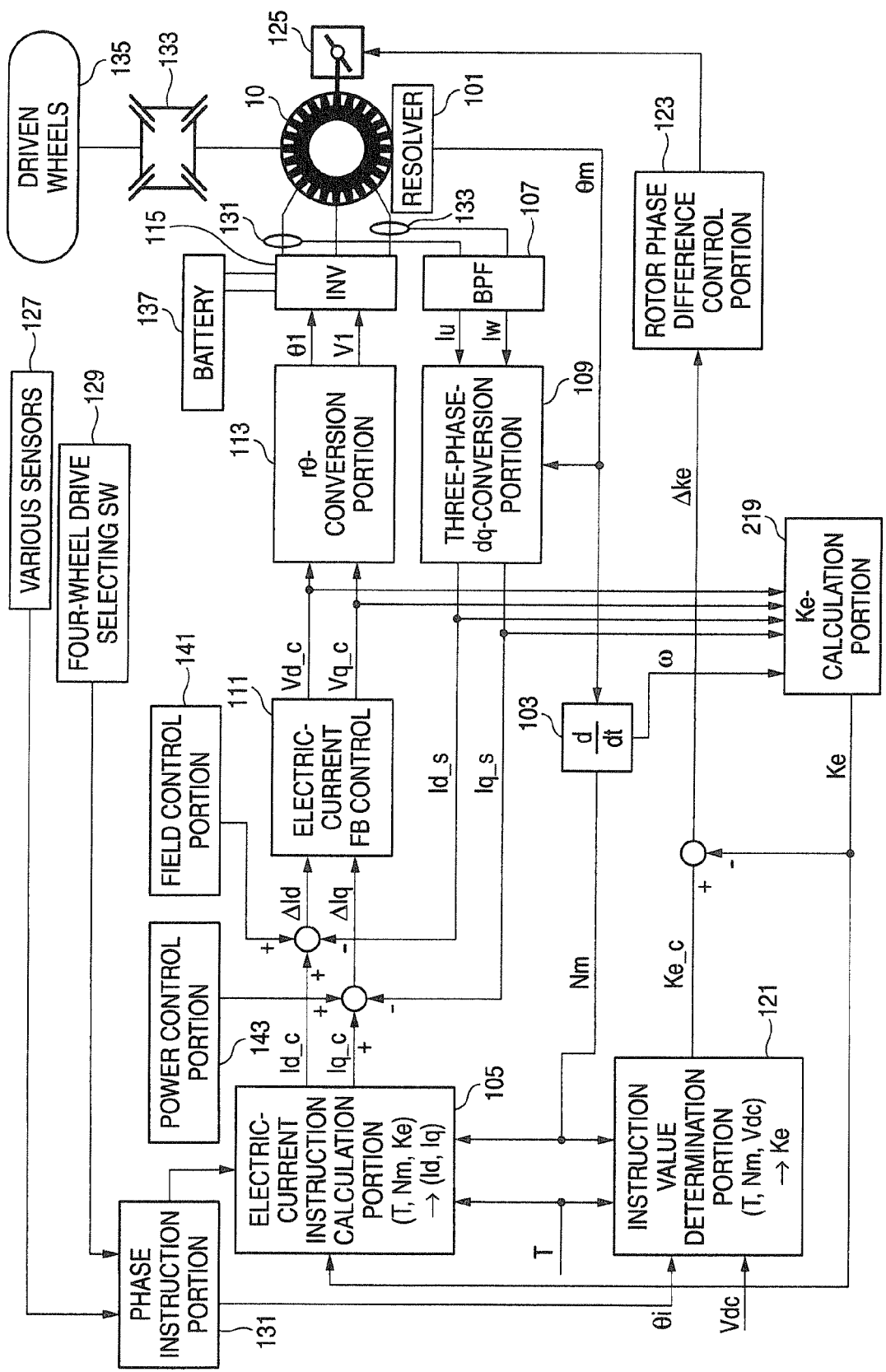
FIG. 11 is a block diagram illustrating a control unit of a motor according to another embodiment of the invention.

Another embodiment of the aforementioned controller for the motor 10 can be configured by including a Ke-calculation portion 219, instead of the Ke-calculation portion 119, to thereby omit the rotor phase difference detection portion 117, as illustrated in FIG. 11. With this configuration, the angular velocity ω calculated by the revolution number calculation portion 103 is sent to the Ke-calculation portion 219. Further, the Ke-calculation portion 219 calculates the induced voltage constant Ke according to the following expression (1).

$$Ke=(Vq-\omega \cdot Ld\omega Id-R\cdot Iq)/\omega \tag{1}$$

(ω: the angular velocity of the motor 10, R: the resistance of each of the q-axis armature and the d-axis armature, Iq: a q-axis current, Vq: an inter-terminal voltage of the q-axis armature, Ld: inductance of the d-axis armature, Id: a d-axis current).

Figure 12:
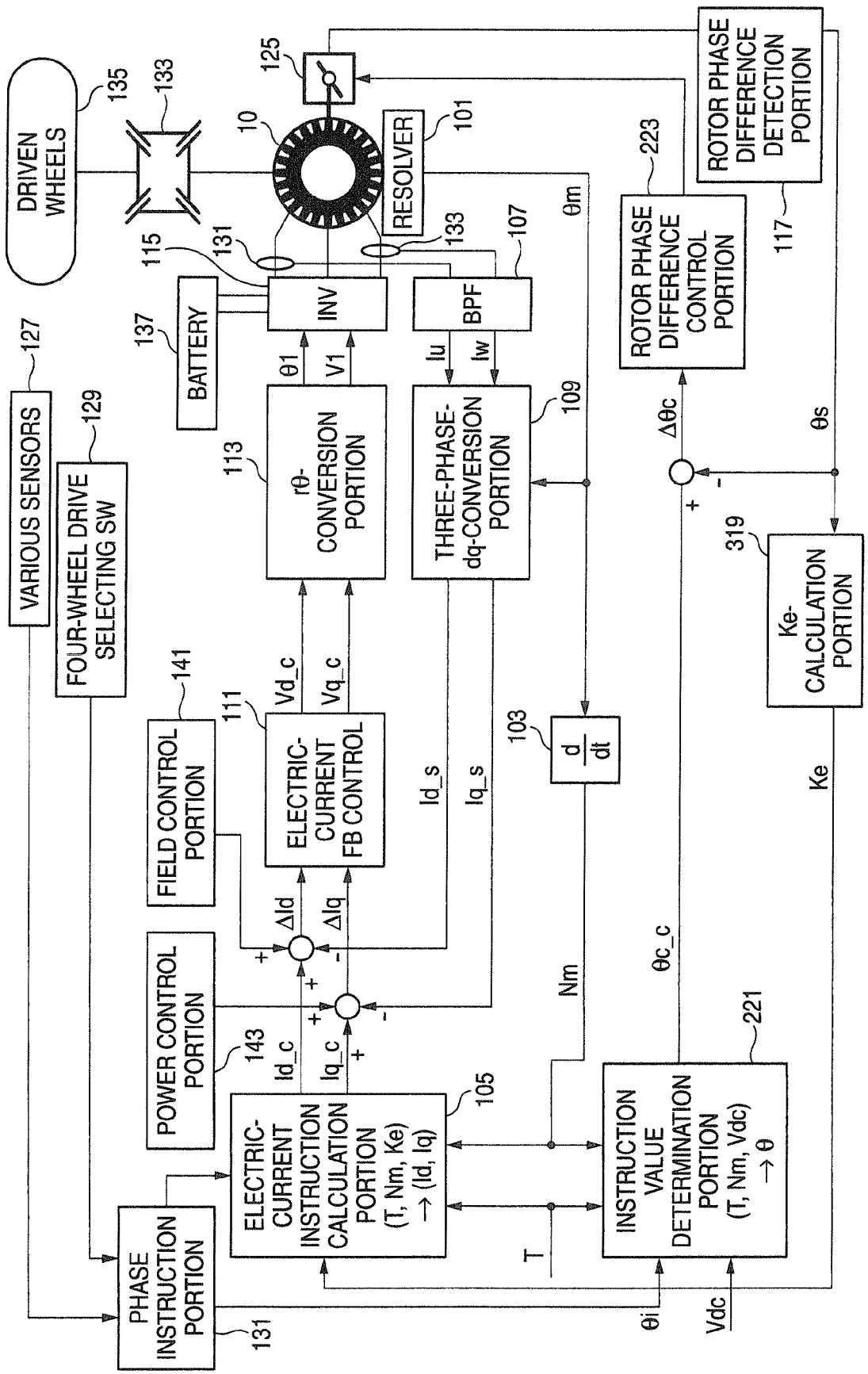
FIG. 12 is a block diagram illustrating a control unit of a motor according to still another embodiment of the invention.

Further, still another embodiment of the aforementioned controller for the motor 10 can be configured by including an instruction value determination portion 221, instead of the instruction value determination portion 121, and by including also a rotor phase difference control portion 223, instead of the rotor phase difference control portion 123, as illustrated in FIG. 12. The instruction value determination portion 221 determines an instruction value θc_c of the rotor phase difference, based on an externally input torque instruction value T, the number of revolutions Nm of the motor 10 calculated by the revolution number calculation portion 103, and a battery voltage Vdc of the battery 137. Further, the instruction value determination portion 221 determines an instruction value θc_c of the rotor phase difference based on a phase instruction value θi sent from the phase instruction portion 131. The rotor phase difference control portion 223 outputs a control signal such that a deviation Δθ between the instruction value θc_c of the rotor phase difference output from the instruction value determination portion 221 and an actual rotor phase difference θs detected by the rotor phase difference detection portion 117 is reduced. Thus, the rotor phase difference control portion 223 controls the actuator 125.

<Operation of Phase Instruction Portion 131>

Hereinafter, the following four processes to be performed by the phase instruction portion 131 are described. That is, the four processes are (1) a process to be performed in response to the turning-on/turning-off of the four-wheel drive selecting switch 129, (2) a process to be performed according to an on-state/off-state of the four-wheel drive selecting switch 129 and according to a result of determination on a slip state, (3) a process to be performed when regenerative braking is performed, and (4) a process to be performed according to an accelerator opening.

(1) Process to be Performed by Phase Instruction Portion 131 in Response to Turning-On/Turning-Off of Four-Wheel Drive Selecting Switch 129

Figure 13:
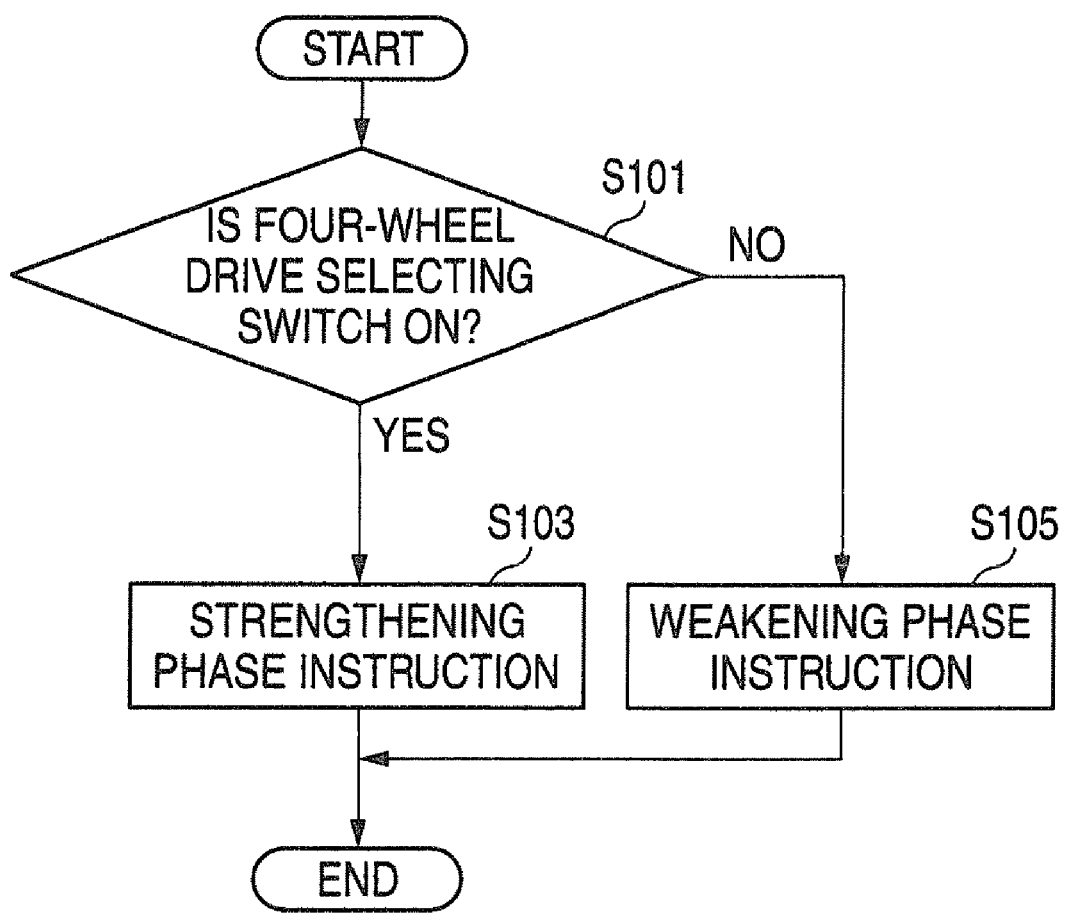
FIG. 13 is a flowchart illustrating a process performed by a phase instruction portion in response to the turning-on/turning-off of a four-wheel drive selecting switch.

A process to be performed by the phase instruction portion 131 in response to the turning-on/turning-off of the four-wheel drive selecting switch 129 is described with reference to FIG. 13. FIG. 13 is a flowchart illustrating a process performed by the phase instruction portion 131 in response to the turning-on/turning-off of the four-wheel drive selecting switch 129. As illustrated in FIG. 13, the phase instruction portion 131 determines a state of the four-wheel drive selecting switch 129 in step S101. If the four-wheel drive selecting switch 129 is on, the phase instruction portion 131 issues a strengthening phase instruction in step S103. If the four-wheel drive selecting switch 129 is off, the phase instruction portion 121 issues a weakening phase instruction in step S105. Incidentally, the strengthening phase instruction is an instruction to make the rotor phase difference zero so as to strengthen a magnetic flux generated at each of the outer circumferential side rotor 21 and the inner circumferential side rotor 22. Further, the weakening phase instruction is an instruction to make the rotor phase difference 180 degrees so as to weaken a magnetic flux generated at each of the outer circumferential side rotor 21 and the inner circumferential side rotor 22.

Figure 14:
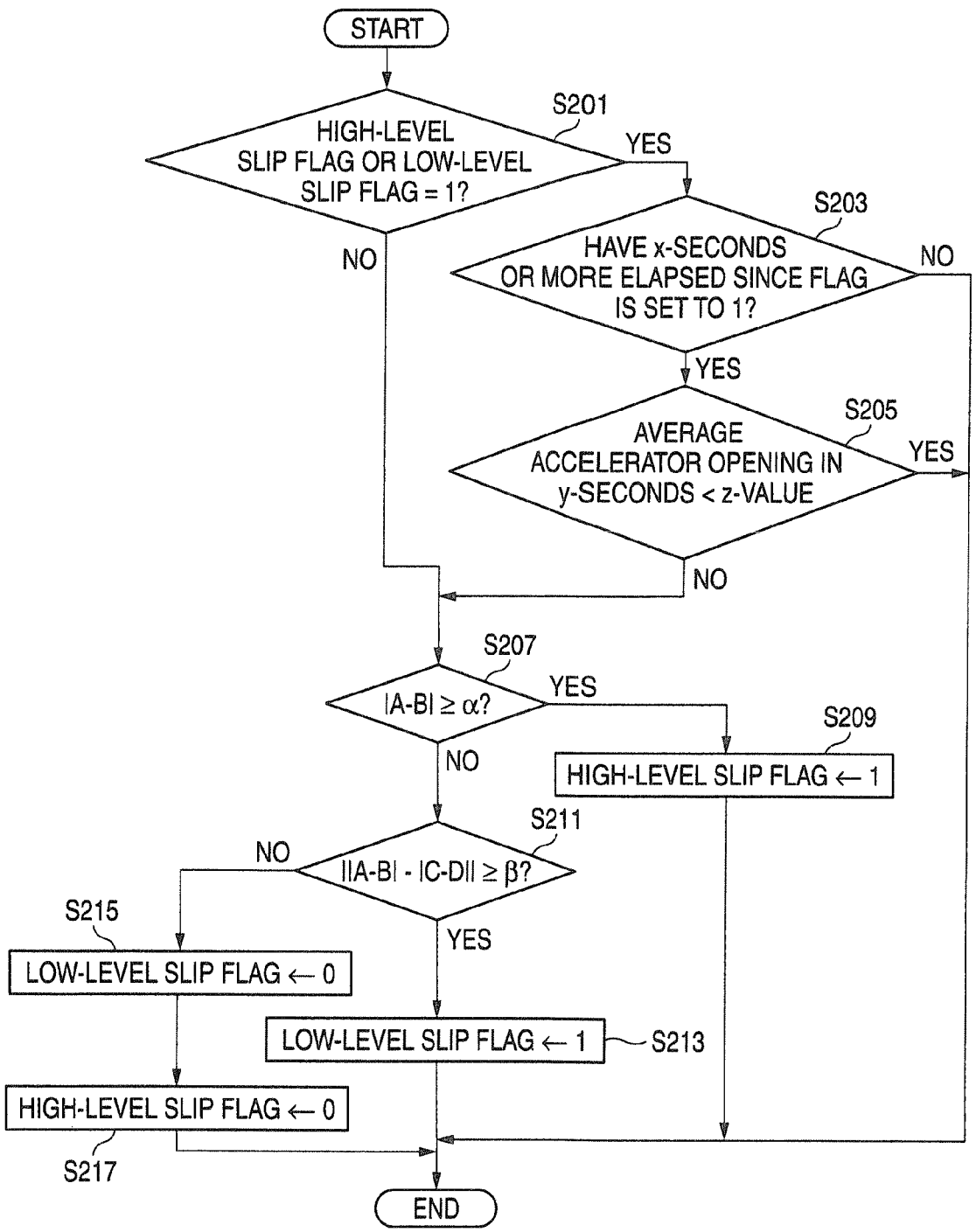
FIG. 14 is a flowchart illustrating a slip determination process performed by the phase instruction portion.
Figure 15:
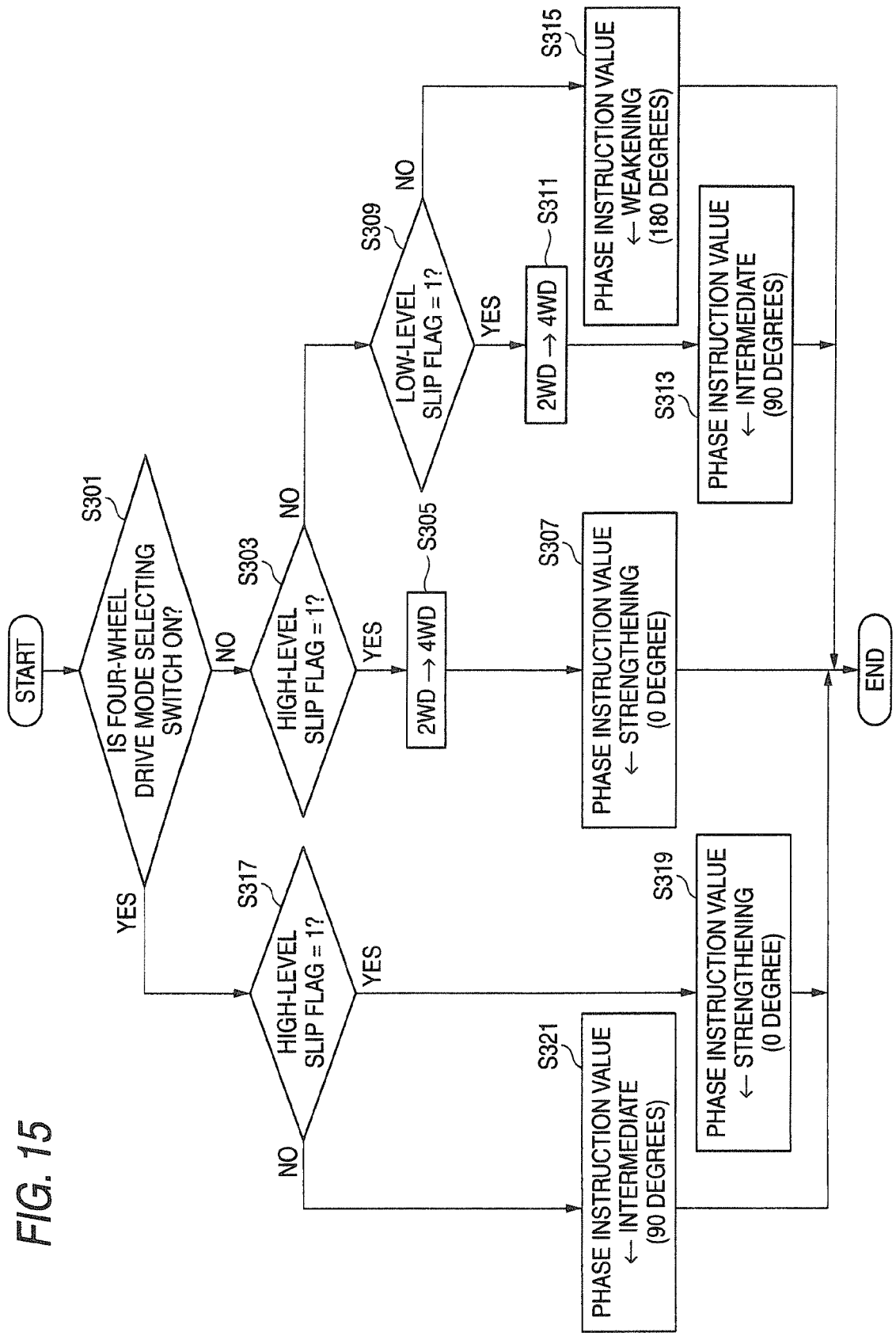
FIG. 15 is a flowchart illustrating a process performed by the phase instruction portion in response to the turning-on/turning-off of a four-wheel drive selecting switch and according to a result of the slip determination process.

(2) Process be Performed by Phase Instruction Portion 131 according to On-State/Off-State of Four-Wheel Drive Selecting Switch 129 and according to Result of Determination on Slip State A process to be performed by the phase instruction portion 131 according to the on-state/off-state of the four-wheel drive selecting switch 129 and according to a result of determination on a slip state is described with reference to FIGS. 14 and 15. FIG. 14 is a flowchart illustrating a slip determination process performed by the phase instruction portion 131. FIG. 15 is a flowchart illustrating a process performed by the phase instruction portion according to the on-state/off-state of the four-wheel drive selecting switch 129 and according to a result of the slip determination process. Incidentally, in the following description, it is assumed that a left wheel and a right wheel of the main driving wheels to be driven by an internal combustion engine and/or a motor are wheels A and B, respectively, and that a left wheel and a right wheel of the driven wheels to be driven by the motor 10 are wheels C and D, respectively.

The phase instruction portion 131 determines slip states of different levels, i.e., a high-level slip state and a low-level slip state, based on the wheel speeds of the wheels A to D detected by the wheel speed sensor included by the various sensors 127. If the wheel speed difference between the wheel A and the wheel B is equal to or more than a predetermined value α (i.e., |A−B|≧α), the phase instruction portion 131 determines that the slip state is a high-level slip state. Further, even in a case where the wheel speed difference between the wheel A and the wheel B is less than the predetermined value α (i.e., |A−B|<α), if the difference between the wheel speed difference (|A−B|) between the wheels A and B and the wheel speed difference (|C−D|) between the wheels C and D is equal to or more than another predetermined value β (i.e., ||A−B|−|C−D||≧β), the phase instruction portion 131 determines that the slip state is a low-level slip state. The phase instruction portion 131 sets a high-level slip flag (i.e., a high-level slip flag←1) when the phase instruction portion 131 determines that the slip state is a high-level slip state. Further, the phase instruction portion 131 sets a low-level slip flag (i.e., a low-level slip flag←1) when the phase instruction portion 131 determines that the slip state is a low-level slip state.

Hereinafter, a slip determination process performed by the phase instruction portion 131 is described in detail with reference to FIG. 14. As illustrated in FIG. 14, in step S201, the phase instruction portion 131 determines whether one of the high-level slip flag and the low-level slip flag is set. If one of the flags is set, the phase instruction portion 131 proceeds to step S203. If none of the flags are set, the phase instruction portion 131 proceeds to step S207. In step S203, the phase instruction portion 131 determines whether a predetermined time (x seconds) has elapsed since the flag is set. If the predetermined time has elapsed, the phase instruction portion 131 proceeds to step S205. If the predetermined time has not elapsed, the slip determination process is finished. In step S205, the phase instruction portion 131 determines whether an average accelerator opening in a predetermined time (y seconds) is less than a predetermined value (z-value). If the average accelerator opening is equal to or more than the predetermined value, the phase instruction portion 131 proceeds to step S207. If the average accelerator opening is less than the predetermined value, the slip determination process is finished.

In step S207, the phase instruction portion 131 determines whether the wheel speed difference between the wheel A and the wheel B serving as two main driving wheels is equal to or more than a predetermined value α (i.e., |A−B|≧α). If the wheel speed difference between the wheels A and B is equal to or more than the predetermined value α, the phase instruction portion 131 determines that the slip state is a high-level slip state. Then, the phase instruction portion 131 proceeds to step S209. In step S209, the phase instruction portion 131 sets a high-level slip flag (i.e., a high-level slip flag←1). On the other hand, if the wheel speed difference between the wheel A and the wheel B is less than the predetermined value α, the phase instruction portion 131 proceeds to step S211. In step S211, the phase instruction portion 131 determines whether the difference obtained by subtracting the wheel speed difference (|C−D|) between the wheels C and D from the wheel speed difference (|A−B|) between the wheels A and B and is equal to or more than another predetermined value β (||A−B|−|C−D||≧β). If the difference between the wheel speed difference (|A−B|) and the wheel speed difference (|C−D|) is equal to or more than the predetermined value β, the phase instruction portion 131 determines that the slip state is a low-level slip state. Then, the phase instruction portion 131 proceeds to step S213. In step S213, the phase instruction portion 131 sets a low-level slip flag (i.e., a low-level slip flag←1). On the other hand, if the difference is less than the predetermined value β, the phase instruction portion 131 proceeds to step S215.

In step S215, the phase instruction portion 131 clears the low-level slip flag (i.e., the low-level slip flag←0). Next, the phase instruction portion 131 proceeds to step S217. In step S217, the phase instruction portion 131 puts down the high-level slip flag (i.e., the high-level slip flag←0)

The phase instruction portion 131 determines a phase instruction based on a result of the aforementioned slip determination and the on-state/off-state of the four-wheel drive selecting switch 129. Hereinafter, a procedure for determining a phase instruction, which is followed by the phase instruction portion 131, is described in detail with reference to FIG. 15. As illustrated in FIG. 15, in step S301, the phase instruction portion 131 determines the state of the four-wheel drive selecting switch 129. If the four-wheel drive selecting switch 129 is off, the phase instruction portion 131 proceeds to step S303. If the four-wheel drive selecting switch 129 is on, the phase instruction portion 131 proceeds to step S317.

In step S303, the phase instruction portion 131 determines whether the high-level slip flag is set. If the high-level slip flag is set, the phase instruction portion 131 proceeds to step S305. If the high-level slip flag has been put down, the phase instruction portion 131 proceeds to step S309. In step S305, the phase instruction portion 131 instructs the electric-current instruction calculation portion 105 to drive the motor 10. Consequently, the drive mode of the vehicle is changed from the two-wheel drive mode to the four-wheel drive mode. After such processing is performed in step S305, the phase instruction portion 131 issues a strengthening phase instruction to the instruction value determination portion 121 in step S307.

In step S309, the phase instruction portion 131 determines whether the low-level slip flag is set. If the low-level slip flag is set, the phase instruction portion 131 proceeds to step S311.

If the low-level slip flag has been put down, the phase instruction portion 131 proceeds to step S315. In step S311, the phase instruction portion 131 instructs the electric-current instruction calculation portion 105 to drive the motor 10. Consequently, the drive mode of the vehicle is changed from the two-wheel drive mode to the four-wheel drive mode. After such processing is performed, the phase instruction portion 131 issues an intermediate phase instruction to the instruction value determination portion 121 in step S313. Incidentally, the intermediate phase instruction is an instruction to make the rotor phase difference 90 degrees. However, when an intermediate phase instruction is issued, the value, to which the rotor phase difference is made, is not limited to 90 degrees. For example, the value, to which the rotor phase difference is made, can be 45 degrees or 135 degrees. In step S315, the phase instruction portion 131 issues a weakening phase instruction to the instruction value determination portion 121.

In a case where the phase instruction portion 131 proceeds to step S317 after the determination is made in step S301, in step S317, the phase instruction portion 131 determines whether the high-level slip flag is set. If the high-level slip flag is set, the phase instruction portion 131 proceeds to step S319. If the high-level slip flag has been put down, the phase instruction portion 131 proceeds to step S321. In step S319, the phase instruction portion 131 issues a strengthening phase instruction to the instruction value determination portion 121. On the other hand, in step S321, the phase instruction portion 131 issues an intermediate phase instruction to the instruction value determination portion 121. Incidentally, if the phase instruction portion 131 determines in step S301 that the four-wheel drive selecting switch 129 is on, the phase instruction portion 131 can perform only issuance of a strengthening phase instruction in step S319, by neither determining in step S317 whether the high-level slip flag is set, nor issuing an intermediate phase instruction in step S321.

Further, in the aforementioned process, the phase instruction portion 131 determines the slip states of the different levels, e.g., a high-level slip state and a low-level slip state. However, the aforementioned process can be modified so that the phase instruction portion 131 determines only whether the high-level slip flag is set, by neither performing the processing to be performed in step S309 nor performing the processing to be performed in step S313. In this case, if it is determined in step S303 that the high-level slip flag has been put down, the phase instruction portion 131 proceeds to step S315.

Figure 16:
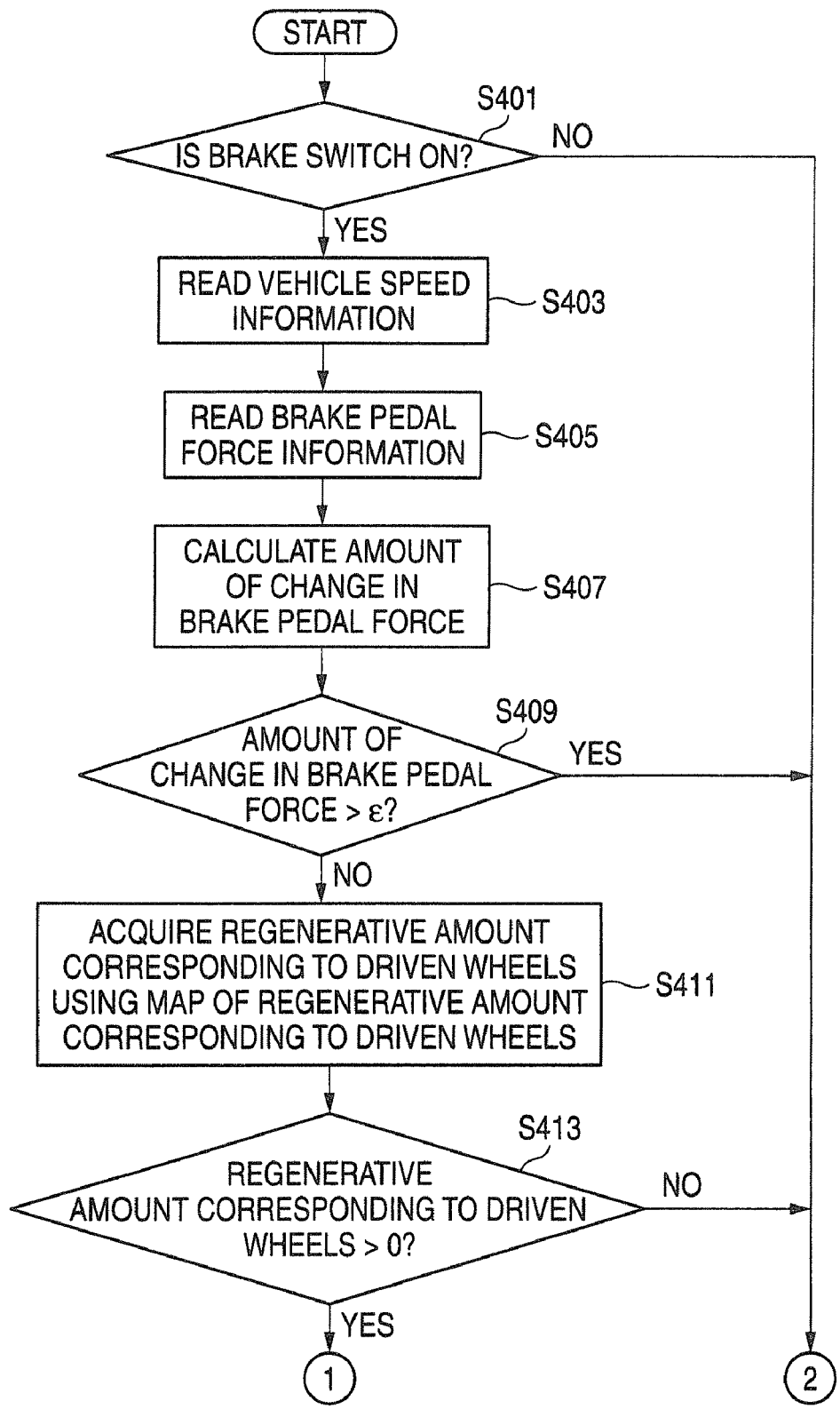
FIG. 16 is a flowchart illustrating a part of a process performed by the phase instruction portion when regenerative braking is performed.
Figure 17:
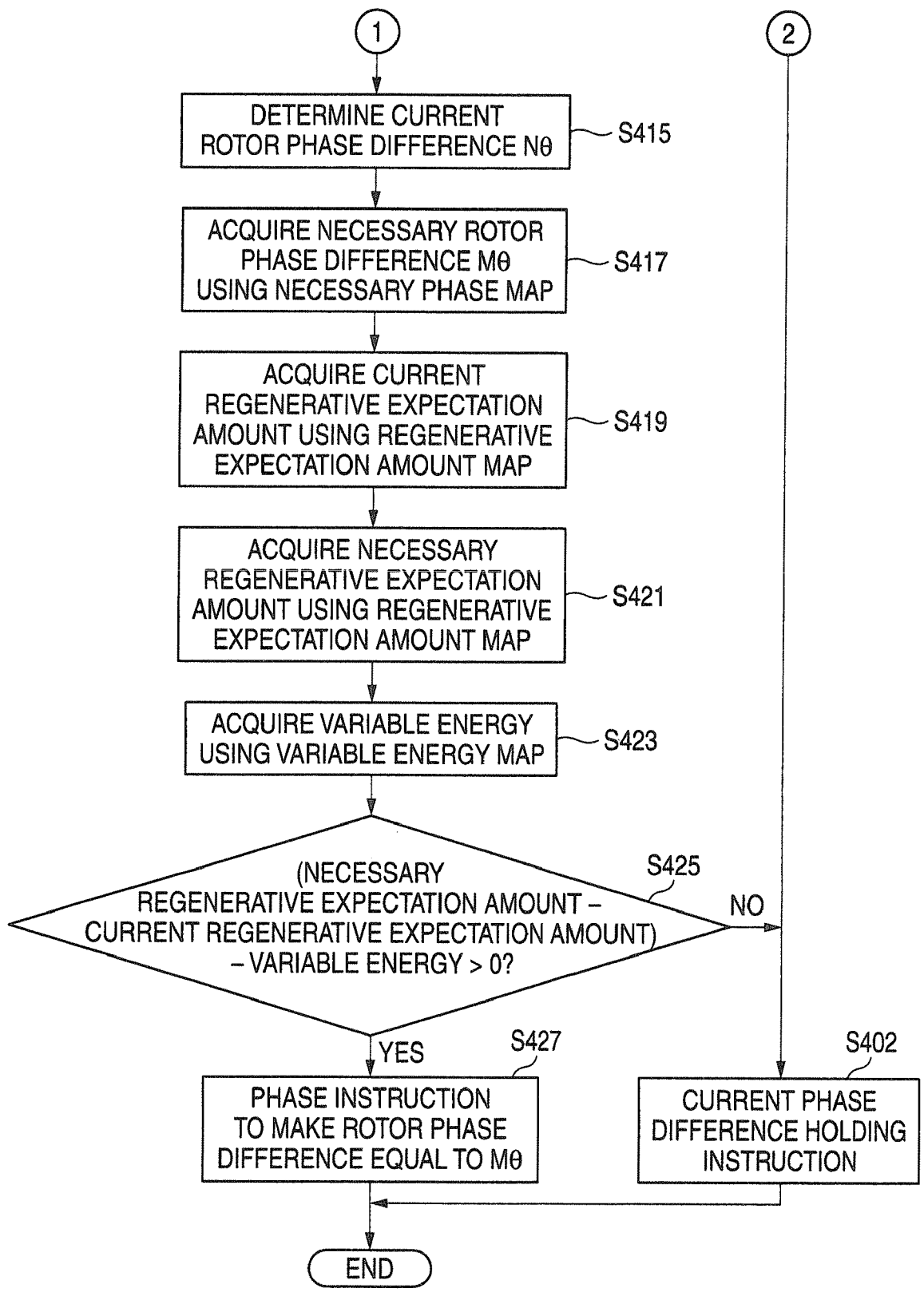
FIG. 17 is a flowchart illustrating the rest of the process performed by the phase instruction portion when the regenerative braking is performed.
Figure 18:
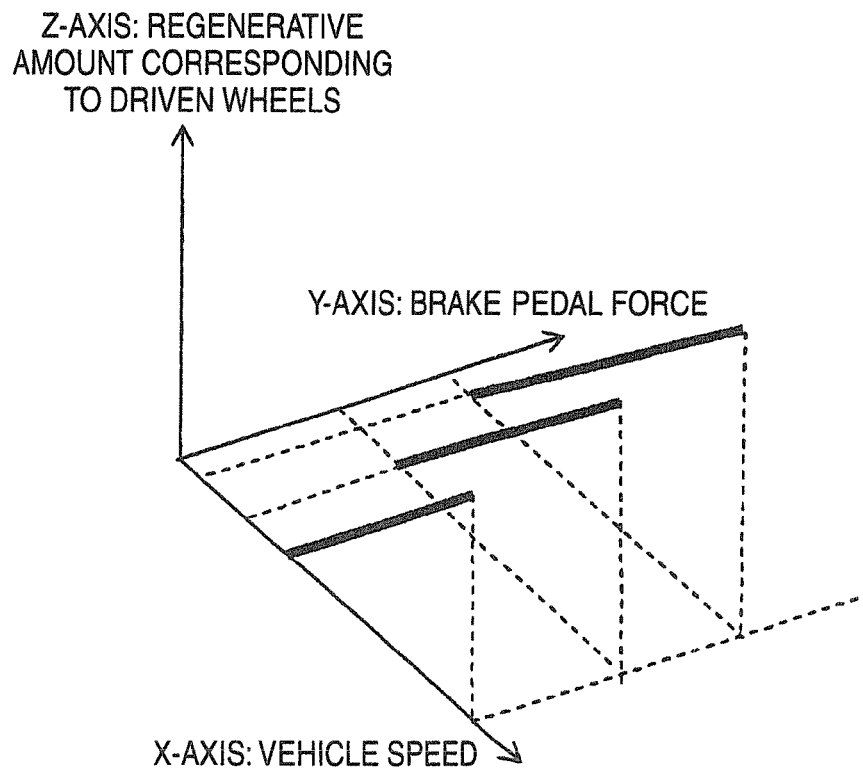
FIG. 18 is a diagram illustrating a map of a regenerative amount corresponding to driven wheels.
Figure 19:
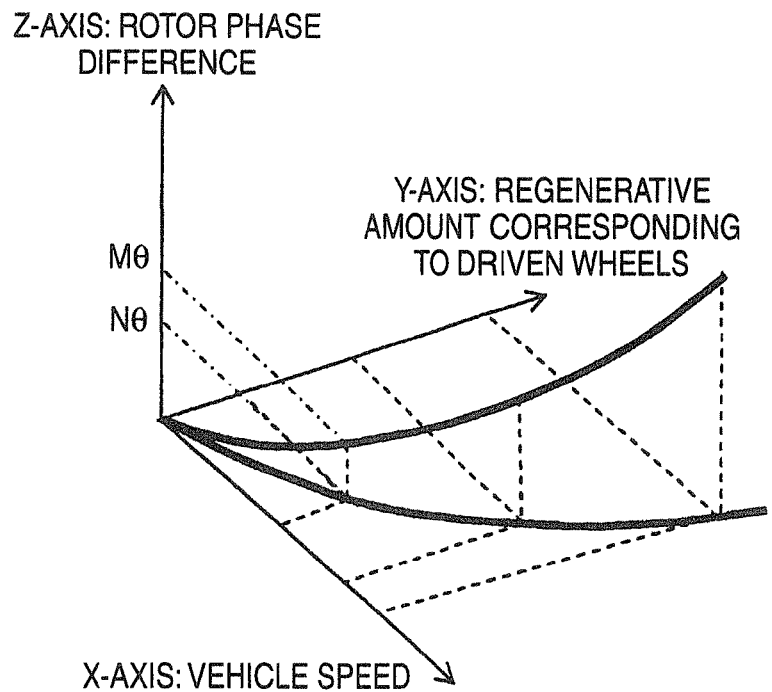
FIG. 19 is a diagram illustrating what is called a necessary phase map.
Figure 20:
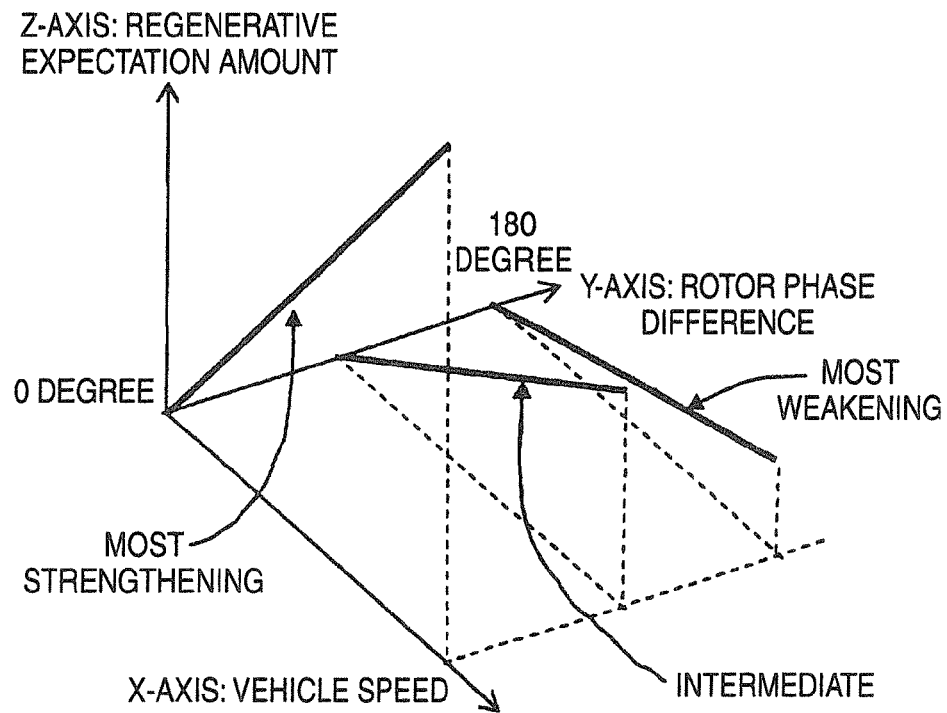
FIG. 20 is a diagram illustrating what is called a regenerative expectation amount map.
Figure 21:
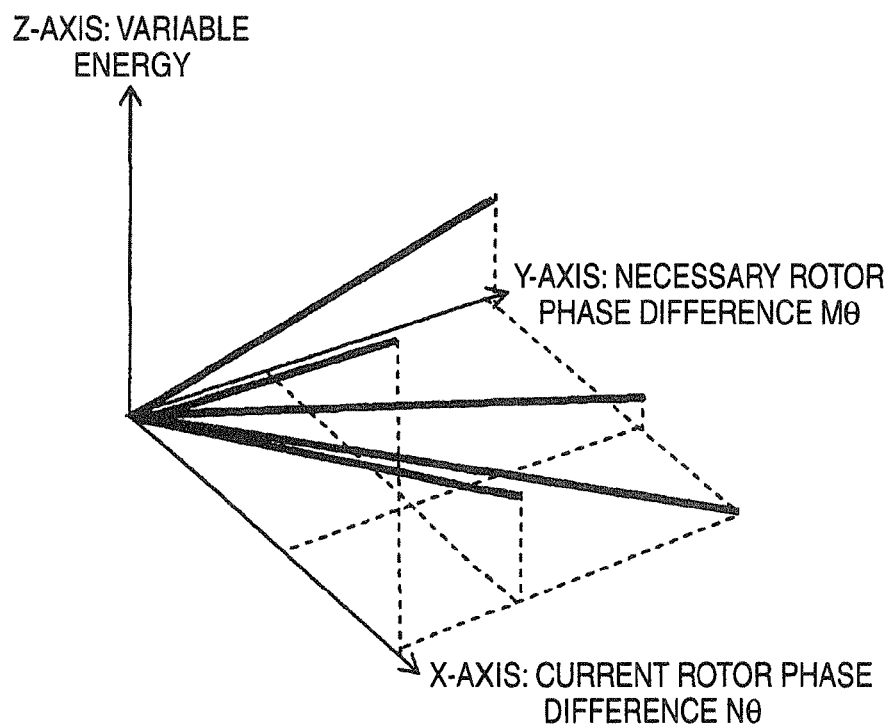
FIG. 21 is a diagram illustrating what is called a variable energy map.

(3) Process to be Performed by Phase Instruction Portion 131 When Regenerative Braking is Performed A process to be performed by the phase instruction portion 131 is described hereinafter with reference to FIGS. 16 to 21. FIGS. 16 and 17 are flowcharts each illustrating a process performed by the phase instruction portion 131 when regenerative braking is performed. Further, FIG. 18 is a diagram illustrating a map of a regenerative amount corresponding to the driven wheels. Further, FIG. 19 is a diagram illustrating what is called a necessary phase map. FIG. 20 is a diagram illustrating what is called a regenerative expectation amount map. Furthermore, FIG. 21 is a diagram illustrating what is called a variable energy map.

As illustrated in FIG. 16, in step S401, the phase instruction portion 131 determines the state of the brake switch included in the various sensors 127. If the brake switch is off, the phase instruction portion 131 proceeds to step 402. If the brake switch is on, the phase instruction portion 131 proceeds to step 403. In step S402, the phase instruction portion 131 issues an instruction to hold a current rotor phase difference.

On the other hand, in step S403, the phase instruction portion 131 reads current vehicle speed information detected by the vehicle speed sensor included in the various sensors 127.

Next, in step S405, the phase instruction portion 131 reads brake pedal force information representing a brake pedal force detected by the brake pedal force sensor included in the various sensors 127. Then, in step S407, the phase instruction portion 131 calculates an amount of change in the brake pedal force per unit time (hereunder referred to as a brake pedal force change amount). Next, in step S409, the phase instruction portion 131 determines whether the brake pedal force change amount is more than a predetermined value $\epsilon$. If the brake pedal change amount is more than the predetermined value, the phase instruction portion 131 proceeds to step S402, in which the phase instruction portion 131 issues an instruction to hold the current rotor phase difference. If the brake pedal change amount is equal to or less than the predetermined value, the phase instruction portion 131 proceeds to step S411. Incidentally, when the brake pedal is suddenly pressed hard, the brake pedal force change amount is larger than the predetermine value. Even in a case where a phase instruction is issued when the brake pedal is suddenly pressed hard, it takes 1 second or so until the rotor phase difference to be controlled by the actuator 125 reaches a value corresponding to the phase instruction. Accordingly, the present embodiment holds the current rotor phase difference.

In step S411, the phase instruction portion 131 acquires energy (corresponding to a regenerative amount), which is to be obtained when regenerative braking is performed on the motor 10 connected to the drive wheels, using the vehicle speed information obtained in step S403, the brake pedal force obtained in step S405, and what is called the map of the regenerative amount corresponding to the drive wheels illustrated in FIG. 18. Next, the phase instruction portion 131 determines whether the regenerative amount obtained in step S411 is more than 0. If the regenerative amount is 0, the phase instruction portion 131 proceeds to step S402, in which the phase instruction portion 131 issues an instruction to hold the current rotor phase difference. If the regenerative amount is more than 0, the phasing instruction portion 131 proceeds to step S415.

As illustrated in FIG. 17, in step S415, the phase instruction portion 131 determines a current rotor phase difference (hereunder referred to as a current rotor phase difference) $N\theta$, based on the electrical angle $\theta m$ detected by the resolver 101. Next, in step S417, the phase instruction portion 131 determines necessary rotor phase difference $M\theta$ required by the motor 10 to generate a vehicular braking force corresponding to the brake pedal force, using the vehicle speed information obtained in step S403, the regenerative amount obtained in step S411, and the necessary phase map illustrated in FIG. 19.

Next, in step S419, the phase instruction portion 131 acquires a regenerative amount (hereunder referred to as a "current regenerative expectation amount") expected to be obtained from the motor 10 in a state in which a current rotor phase difference is the difference $N\theta$, using vehicle speed information obtained in step S403, the current rotor phase difference $N\theta$ obtained in step S415, and a regenerative expectation amount illustrating in FIG. 20. Then, in step S421, the phase instruction portion 131 acquires a regenerative amount (hereunder referred to as a necessary regenerative expectation amount) expected to be obtained from the motor 10 in a state, in which the rotor phase difference is the necessary rotor phase difference $M\theta$, using the vehicle speed information obtained in step S403, the necessary rotor phase difference $M\theta$ obtained in step S417, and a regenerative expectation amount map illustrated in FIG. 20.

Next, in step S423, the phase instruction portion 131 acquires energy (hereunder referred to as "variable energy") required by the actuator 125 to change the rotor phase difference of the motor 10 from the current rotor phase difference to the necessary rotor phase difference Mθ, using the current rotor phase difference Nθ obtained in step S415, the necessary rotor phase difference Mθ obtained in step S417, and a variable energy map illustrated in FIG. 21. Next, in step S425, the phase instruction portion 131 determines whether the difference obtained by subtracting the variable energy, which is obtained in step S423, from the difference between the necessary regenerative expectation amount obtained in step S421 and the current regenerative expectation amount obtained in step S419 is larger than 0. If the value of this difference is 0, the phase instruction portion 131 proceeds to step S402, in which the phase instruction portion 131 issues an instruction to hold the current rotor phase difference. On the other hand, if the value of this difference is larger than 0, the phase instruction portion 131 proceeds to step S427, in which the phase instruction portion 131 issues a phase instruction to the instruction value determination portion 121 to make the rotor phase difference of the motor 10 equal to the rotor phase difference Mθ.

Figure 22:
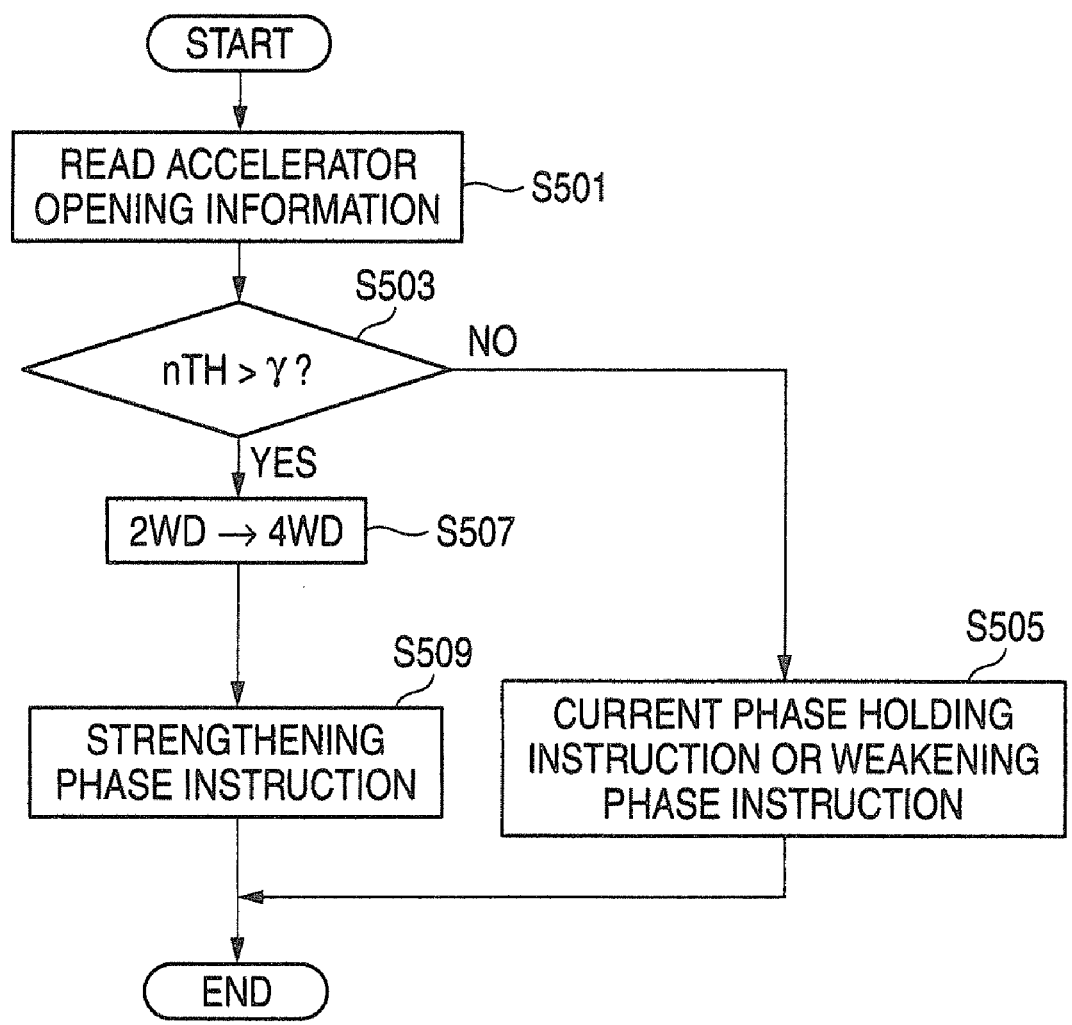
FIG. 22 is a flowchart illustrating process performed by the phase instruction portion according to an accelerator opening.

(4) Process to be Performed by Phase Instruction Portion 131 According to Accelerator Opening A process to be performed by the phase instruction portion 131 according to an accelerator opening is described hereinafter with reference to FIG. 22. FIG. 22 is a flowchart illustrating a process performed by the phase instruction portion 131 according to an accelerator opening. As illustrated in FIG. 22, the phase instruction portion 131 reads accelerator-opening information detected by the various sensors 127 in step S501. Next, in step S503, the phase instruction portion 131 determines whether an accelerator opening (nTH) obtained in step S501 is larger than a predetermined value γ. If the accelerator opening is equal to or less than the predetermined value γ, the phase instruction portion 131 proceeds to step S505. If the accelerator opening is more than the predetermined value γ, the phase instruction portion 131 proceeds to step S507.

In step S505, the phase instruction portion 131 gives the instruction value determination portion 121 a weakening phase instruction, or an instruction to hold a current rotor phase difference. On the other hand, in step S507, the phase instruction portion 131 instructs the electric-current instruction calculation portion 105 to drive the motor 10. Consequently, the drive mode of the vehicle is changed from the two-wheel drive mode to the four-wheel drive mode. After processing is performed in step 507, the phase instruction portion 131 gives a strengthening phase instruction to the instruction value determination portion 121 in step S509.

As described above, the controller for the motor 10 according to the present embodiment makes the rotor phase of the motor 10 a weakening phase, in a two-wheel drive mode in which the vehicle is not in a slip state. The drag loss of the motor 10, whose rotor phase is a weakening phase, is small. Thus, in the two-wheel drive mode in which the vehicle performs running by driving only main driving wheels, an amount of a driving force which is generated by a power source for driving the main driving wheels and is consumed for the drag rotation of the motor 10, is reduced. Thus, the power source for driving the main driving wheels can generate a necessary driving force with minimum consumption energy. Consequently, the fuel cost of the vehicle is improved.

When a slip state occurs, the drive mode is changed to the four-wheel drive mode. In addition, the rotor phase difference is changed to a strengthening phase or an intermediate phase according to the slip state. Thus, in the four-wheel drive mode in which the vehicle performs running by driving the main driving wheels and the driven wheels, the motor 10 can be driven in a state in which the vehicle makes the best use of the performance of the motor 10 whose torque is changed according to the rotor phase difference.

Further, when regenerative braking is performed, in a case where the difference between the necessary regenerative expectation amount and the current regenerative expectation amount is determined to be larger than the variable energy, based on the current regenerative expectation amount expected to be obtained from the motor 10 according to the vehicle speed and the brake pedal force in the state using the current rotor phase difference, the necessary regenerative expectation amount expected to be obtained from the motor 10 in a state in which the rotor phase difference has a value of the necessary rotor phase difference required by the motor 10 to generate a vehicle braking force, and the variable energy required by the actuator 125, which changes the value of the current rotor phase difference, to change the value of the current rotor phase difference to that of the necessary rotor phase difference, the value of the current rotor phase difference is changed to the value of the necessary rotor phase difference. Accordingly, regenerative energy can efficiently be obtained.

In addition, when a driver presses down on an accelerator hard, the drive mode is switched to the four-wheel drive mode. Then, the rotor phase difference is set to be a strengthening phase. Thus, the motor 10 can be driven in a state in which the vehicle makes the best use of the performance of the motor 10.

In the foregoing description of the embodiment, an example has been described, in which the motor 10 is provided in the four-wheel drive vehicle that has two main driving wheels and two driven wheels. However, the number of the driven wheels according to the invention is not limited to 2. The motor 10 can be provided in the all-wheel drive vehicle that has four or more driven wheels. The aforementioned strengthening instruction according to the invention is not limited to the instruction to make the rotor phase difference zero in electric angle. The strengthening instruction according to the invention can be an instruction to make the rotor phase difference equal to a most efficient value determined using the number of revolutions of the motor 10 and to the torque obtained from the motor 10.

What is claimed is:

1. A controller for a permanent magnet field motor comprising a first rotor and a second rotor concentrically provided around a rotating shaft and a phase changing device for changing an angle of relative displacement in a circumferential direction between the first rotor and the second rotor to serve as a power source for driving driven wheels of an all-wheel drive vehicle having two main driving wheels and at least two driven wheels, the controller comprising:
a drive control portion to control driving of the motor according to a drive mode of the all-wheel drive vehicle; and
a phase instruction portion to issue an instruction, when the drive mode of the all-wheel drive vehicle is a main-driving-wheel drive mode in which the all-wheel drive vehicle is driven only by the main driving wheels, to set the angle of relative displacement at an angle at which a magnetic flux generated at each of the first and second rotors is weakened, as compared with that generated at each of the first and second rotors in an all-wheel drive mode in which the all-wheel drive vehicle is driven by the main driving wheels and the drive wheels.

2. The controller for a motor according to claim 1, wherein an angle indicated by an instruction issued by the phase instruction portion in the main-driving-wheel drive mode is an angle of relative displacement at which a magnetic flux generated at each of the first rotor and the second rotor is most weakened.

3. The controller for a motor according to claim 1, further comprising:
a drive mode selecting portion to enable a driver of the all-wheel drive vehicle to select one of the main-driving-wheel drive mode and the all-wheel drive mode, wherein
the drive control portion controls driving of the motor according to the drive mode selected by the drive mode selecting portion.

4. The controller for a motor according to claim 3, wherein the angle of relative displacement set by the instruction issued by the phase instruction portion in the all-wheel drive mode is an angle of relative displacement at which a magnetic flux generated at each of the first rotor and the second rotor is most strengthened.

5. The controller for a motor according to claim 1, further comprising:
a wheel speed sensor to detect a wheel speed of each of the main driving wheels and the driven wheels; and
a slip state determination portion to determine occurrence of a slip state based on the wheel speed of each of the wheels detected by the wheel speed sensor, wherein
when the slip state determination portion determines that a slip state occurs, after the drive control portion drives the motor and sets the drive mode to be the all-wheel drive mode, the phase instruction portion issues an instruction to set the angle of relative displacement at an angle at which a magnetic flux generated at each of the first rotor and the second rotor is strengthened, as compared with that generated at each of the first rotor and the second rotor in the main-driving-wheel drive mode.

6. The controller for a motor according to claim 5, wherein the slip state determination portion determines occurrence of each of slip states of different levels which include a high-level slip state to be determined based on a wheel speed difference between the two main driving wheels and a low-level slip state to be determined based on a wheel speed difference between the two main driving wheels and a wheel speed difference between the driven wheels;
when the slip state determination portion determines that a high-level slip state occurs, after the drive control portion drives the motor and sets the drive mode thereof to be the all-wheel drive mode, the phase instruction portion issues an instruction to set the angle of relative displacement at an angle at which a magnetic flux generated at each of the first rotor and the second rotor is most strengthened; and
when the slip state determination portion determines that a low-level slip state occurs, after the drive control portion drives the motor and sets the drive mode thereof to be the all-wheel drive mode, the phase instruction portion issues an instruction to set the angle of relative displacement at an angle at which a magnetic flux generated at each of the first rotor and the second rotor is strengthened, as compared with that generated at each of the first rotor and the second rotor in the main-driving-wheel drive mode.

7. The controller for a motor according to claim 5, wherein the angle of relative displacement set by the instruction issued by the phase instruction portion in the all-wheel drive mode is an angle of relative displacement at which a magnetic flux generated at each of the first rotor and the second rotor is most strengthened.

8. The controller for a motor according to claim 1, further comprising:
a vehicle speed sensor to detect a speed of the all-wheel drive vehicle;
a brake pedal force sensor to detect a brake pedal force indicating a degree of a driver's operation performed on a brake of the all-wheel drive vehicle; and
a displacement angle sensor to detect the angle of relative displacement, wherein
when braking of the power source is performed, the phase instruction portion obtains a first regenerative expectation amount expected as obtained from the motor in a state in which the angle of relative displacement is a current angle of relative displacement detected by the displacement angle sensor, a second regenerative expectation amount expected as obtained from the motor in a state in which the angle of relative displacement has a magnitude required by the motor to generate a braking force of the all-wheel drive vehicle corresponding to the brake pedal force, and energy required by the phase changing device to change the current angle of relative displacement to an angle of relative displacement having the magnitude required by the phase changing device, based on the vehicle speed detected by the vehicle speed sensor and the brake pedal force detected by the brake pedal force sensor; and
when a difference value between the first regenerative expectation amount and the second regenerative expectation amount is larger than the energy, the phase instruction portion issues an instruction to change the current angle of relative displacement to the angle of relative displacement having the magnitude required by the motor.

9. A controller for a permanent magnet field motor comprising a first rotor and a second rotor concentrically provided around a rotating shaft and a phase changing device for changing an angle of relative displacement in a circumferential direction between the first rotor and the second rotor to serve as a power source for driving driven wheels of an all-wheel drive vehicle having two main driving wheels and at least two driven wheels,
the controller comprising:
a drive control portion to control driving of the motor according to a drive mode of the all-wheel drive vehicle;
an accelerator-opening sensor to detect an accelerator-opening indicating a degree of a driver's operation performed on an accelerator of the all-wheel drive vehicle; and
a phase instruction portion to issues an instruction, when the accelerator-opening detected by the accelerator-opening sensor is larger than a predetermined value, to cause the drive control portion to drive the motor and to set the drive mode of the all-wheel drive vehicle to be an all-wheel drive mode in which the all-wheel drive vehicle is driven by the main driving wheels and the drive wheels so as to set an angle of relative displacement at an angle at which a magnetic flux generated at each of the first and second rotors is strengthened, as compared with that generated at each of the first and second rotors in a main-driving-wheel drive mode in which the all-wheel drive vehicle is driven only by the main driving wheels.

10. The controller for a motor according to claim 9, wherein when the accelerator-opening is equal to or less than the predetermined value, the phase instruction portion issues an instruction to set the angle of relative displacement at an angle at which a magnetic flux generated at each of the first and second rotors is weakened, as compared with that generated at each of the first and second rotors in the all-wheel drive mode.

* * * * *